June 2, 1925.

H. E. THOMPSON

PHONOGRAPH

Filed Sept. 28, 1920

1,540,376

13 Sheets-Sheet 3

Inventor
Harold E. Thompson,

By Hood & Schley.

Attorneys

June 2, 1925.

H. E. THOMPSON 1,540,376

PHONOGRAPH

Filed Sept. 28, 1920

13 Sheets-Sheet 4

Inventor
Harold E. Thompson,

By Hood & Schley.

Attorneys

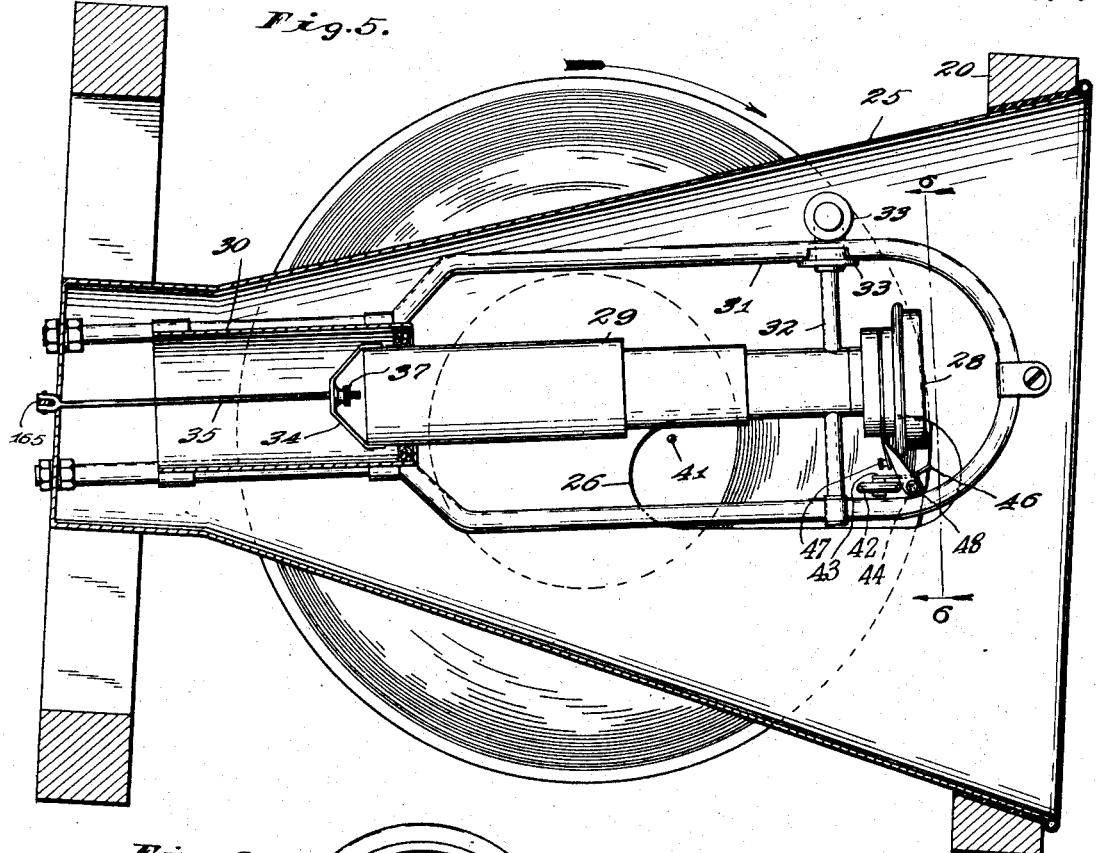
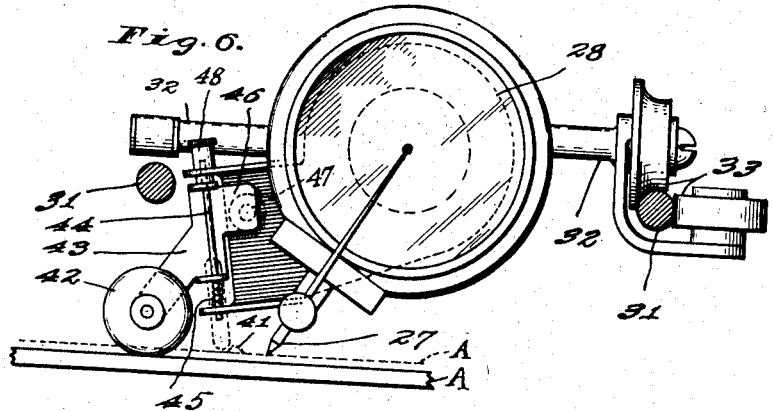
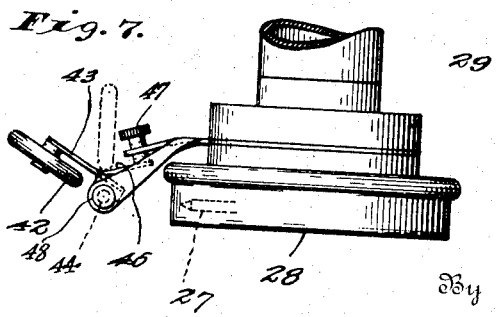

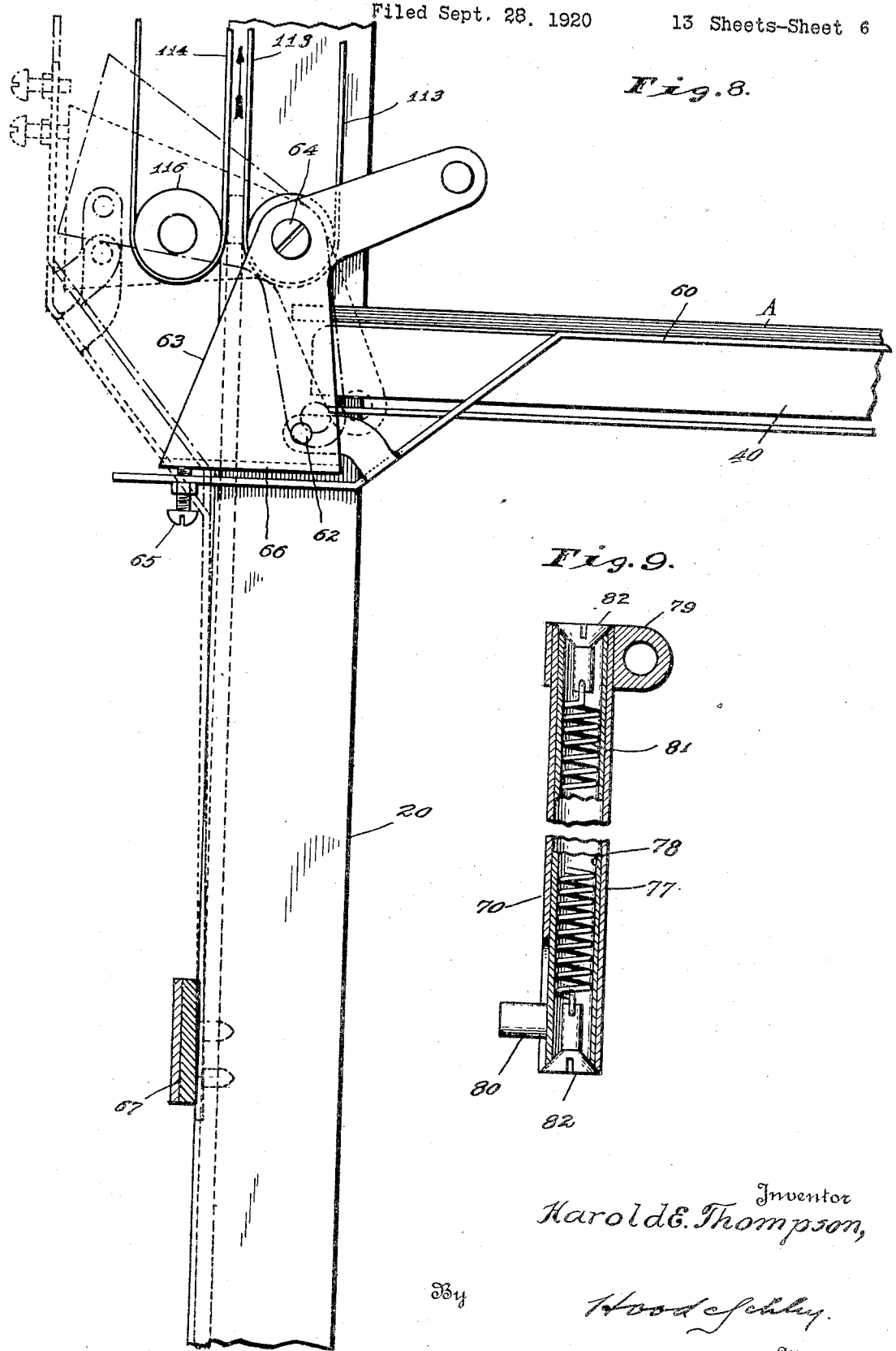

June 2, 1925.  
H. E. THOMPSON  
PHONOGRAPH  
Filed Sept. 28, 1920  
1,540,376  
13 Sheets-Sheet 7

Inventor  
Harold E. Thompson,  
By  
Attorneys

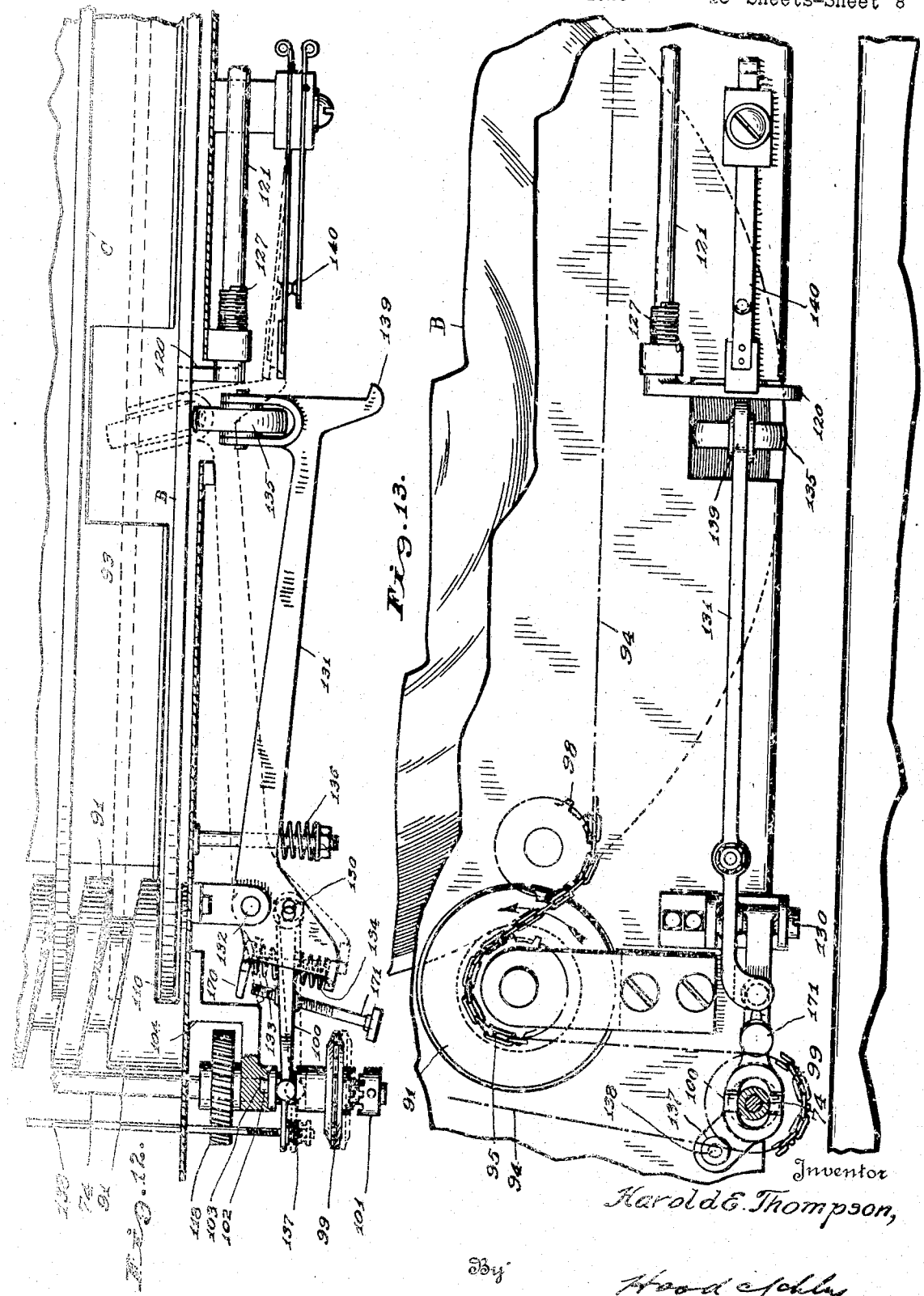

June 2, 1925.

H. E. THOMPSON

PHONOGRAPH

Filed Sept. 28, 1920

1,540,376

13 Sheets-Sheet 9

Inventor
Harold E. Thompson,

By
*[signature]*
Attorneys

June 2, 1925.  H. E. THOMPSON  1,540,376
PHONOGRAPH
Filed Sept. 28, 1920    13 Sheets-Sheet 12

Inventor
Harold E. Thompson,
By Hood Ashley
Attorneys

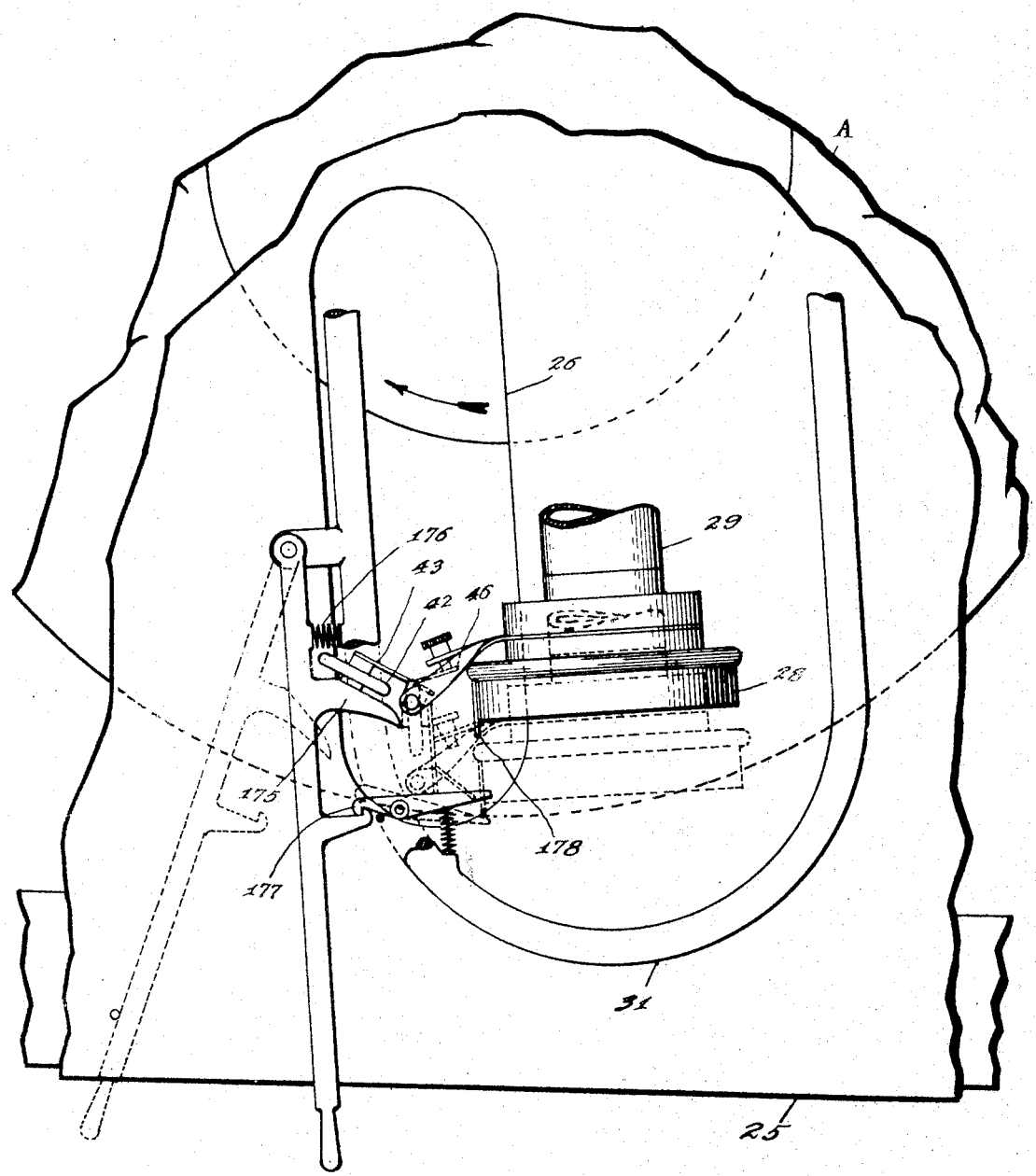

Patented June 2, 1925.

1,540,376

UNITED STATES PATENT OFFICE.

HAROLD E. THOMPSON, OF INDIANAPOLIS, INDIANA.

PHONOGRAPH.

Application filed September 28, 1920. Serial No. 413,372.

*To all whom it may concern:*

Be it known that I, HAROLD E. THOMPSON, a citizen of the United States, residing at Indianapolis, in the county of Marion and State of Indiana, have invented a new and useful Phonograph, of which the following is a specification.

It is the object of my invention to provide, in a compact structure, which may be contained within an ordinary phonograph case, an automatic phonograph which will play a number of records, in any desired sequence, automatically changing records when one has been played, with intermissions of a length controllable at will between successive records: in which a record being played is horizontal, in normal playing position; in which the records played and to be played are stored in vertical position, at the top of the machine where they are accessible, and in a manner permitting the stored records to be removed and replaced and changed in order at will whether or not the machine is in operation and whether or not a record at the time is being played; and in which the playing may be made to continue indefinitely or to stop after a predetermined number of records have been played.

Figure 1:
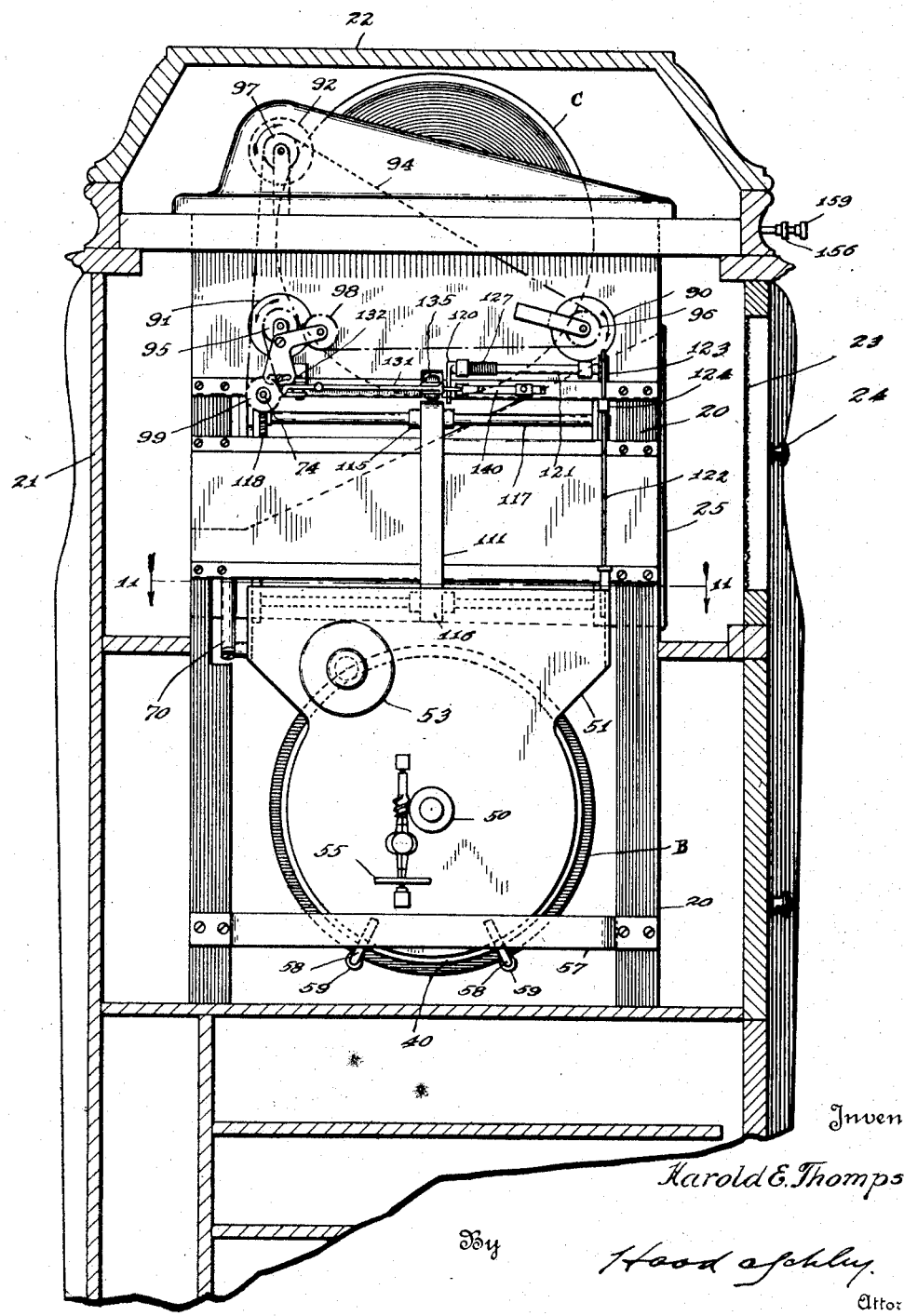
Figure 2:
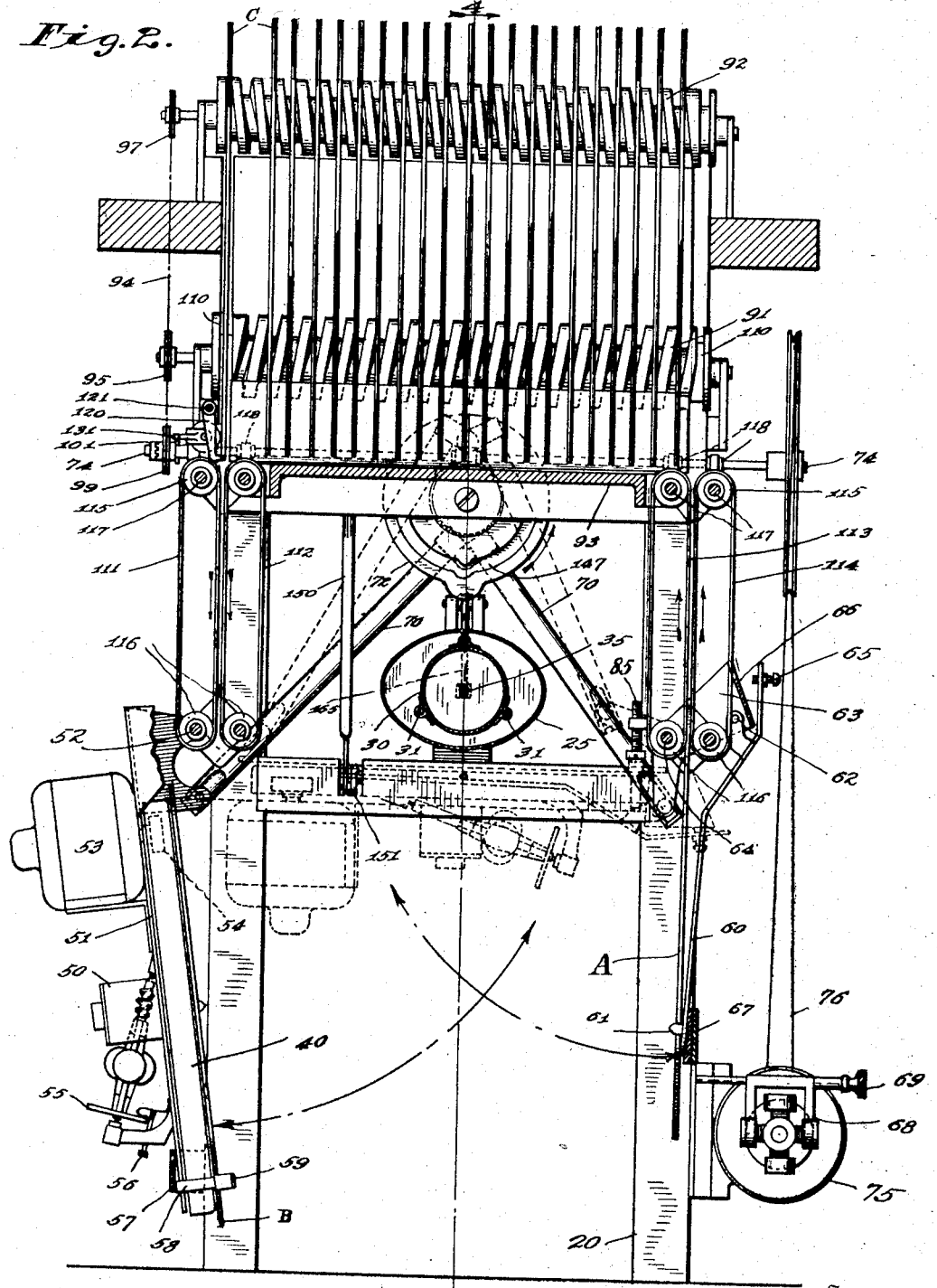
Figure 3:
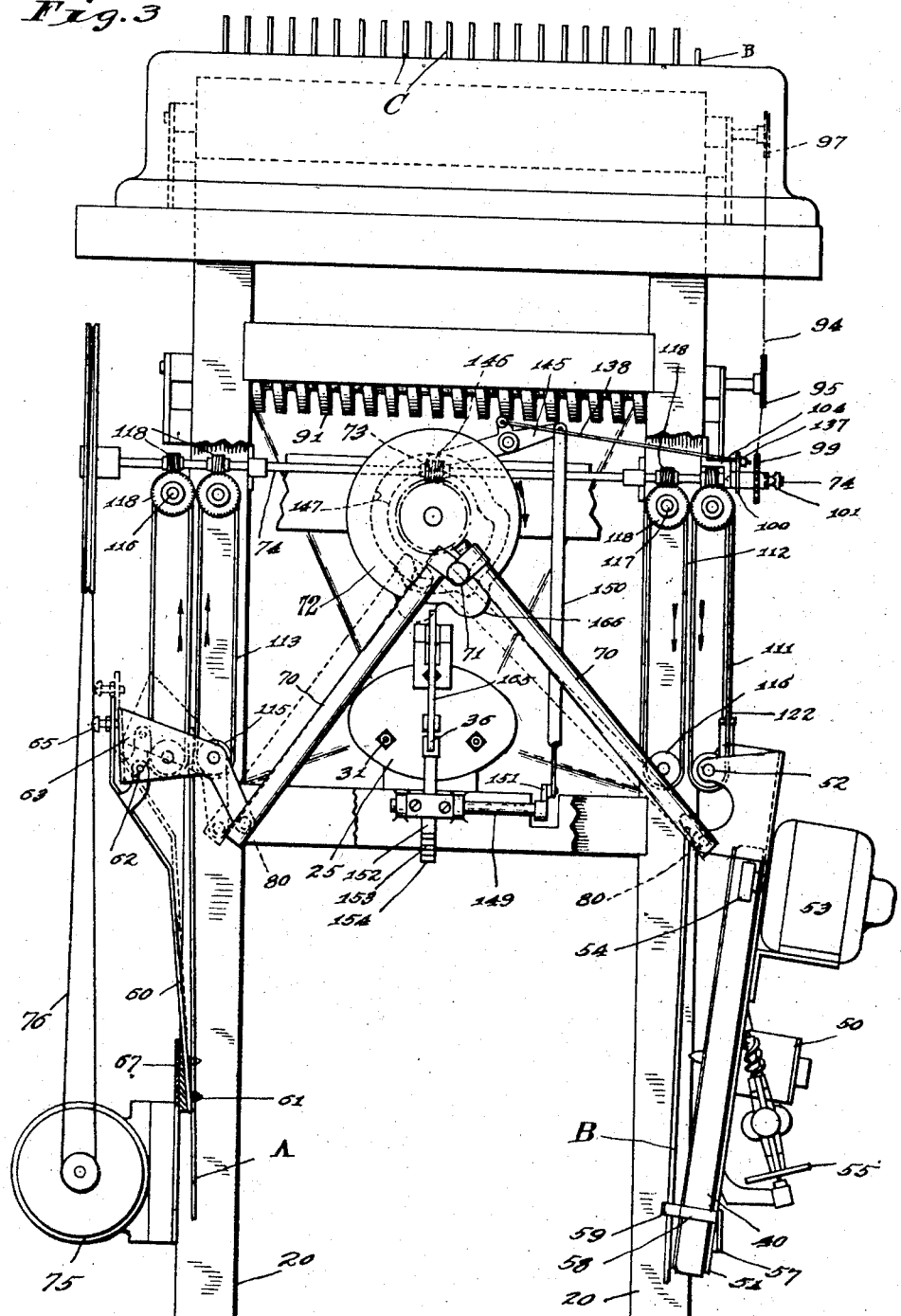
Figure 4:
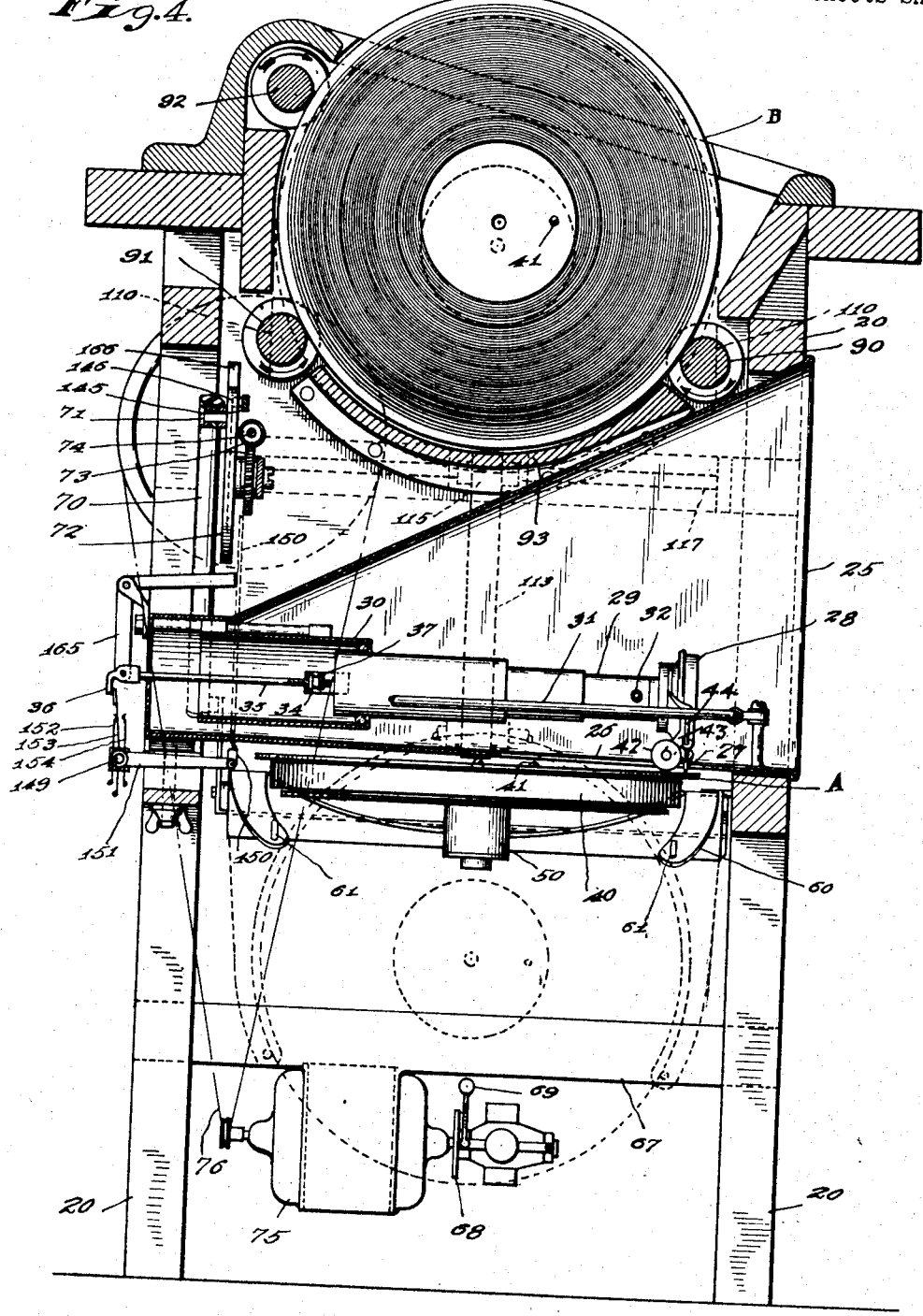
Figure 10:
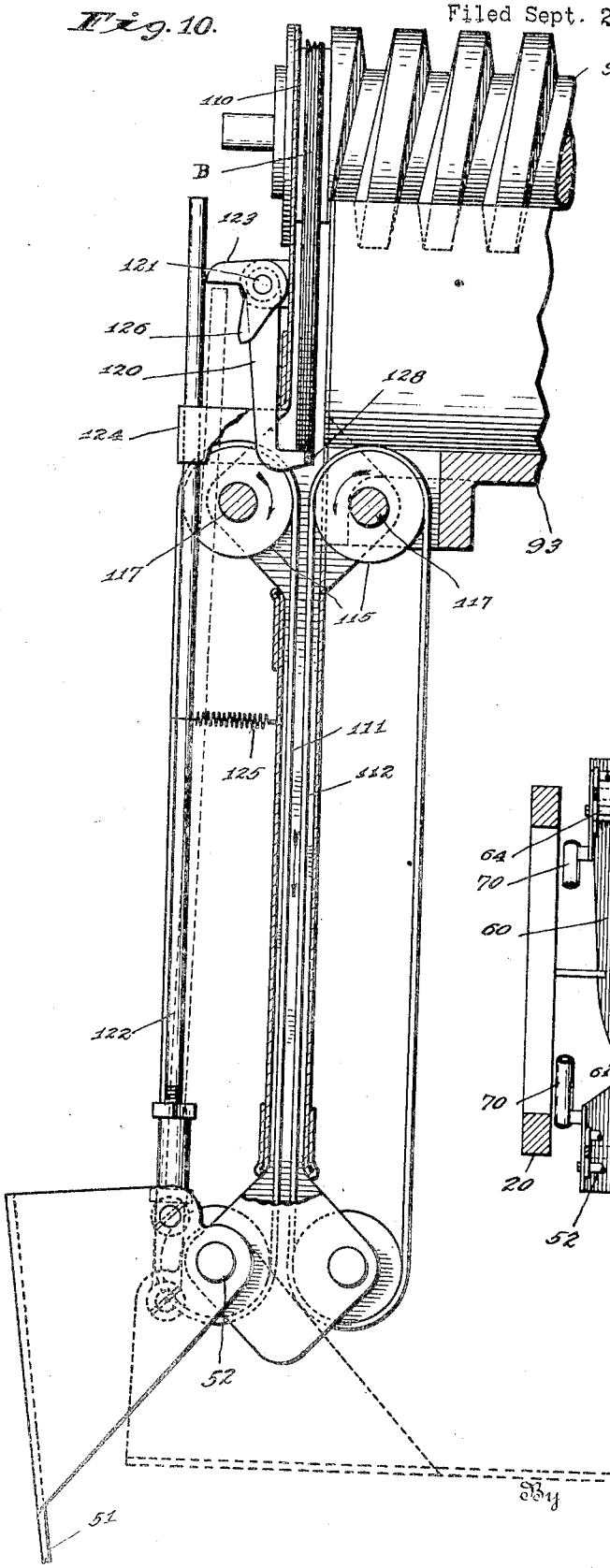
Figure 11:
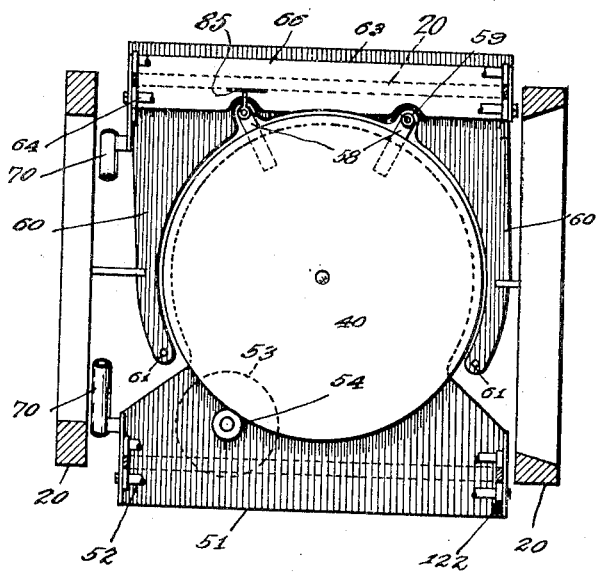
Figure 14:
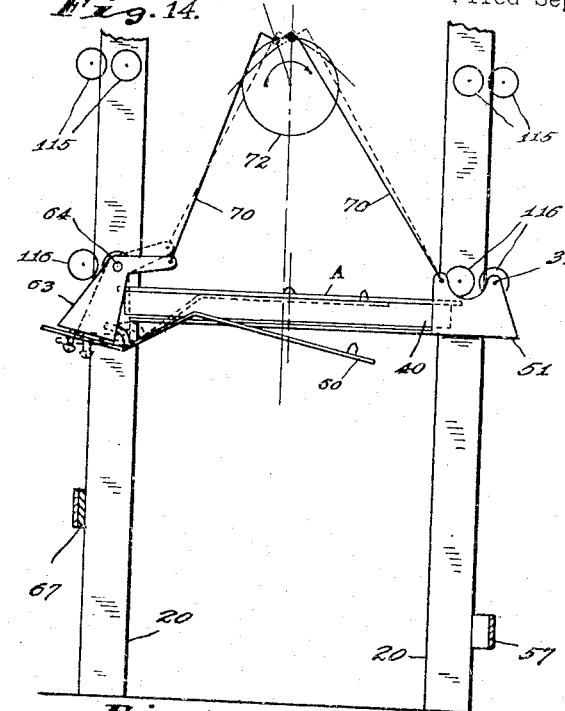
Figure 18:
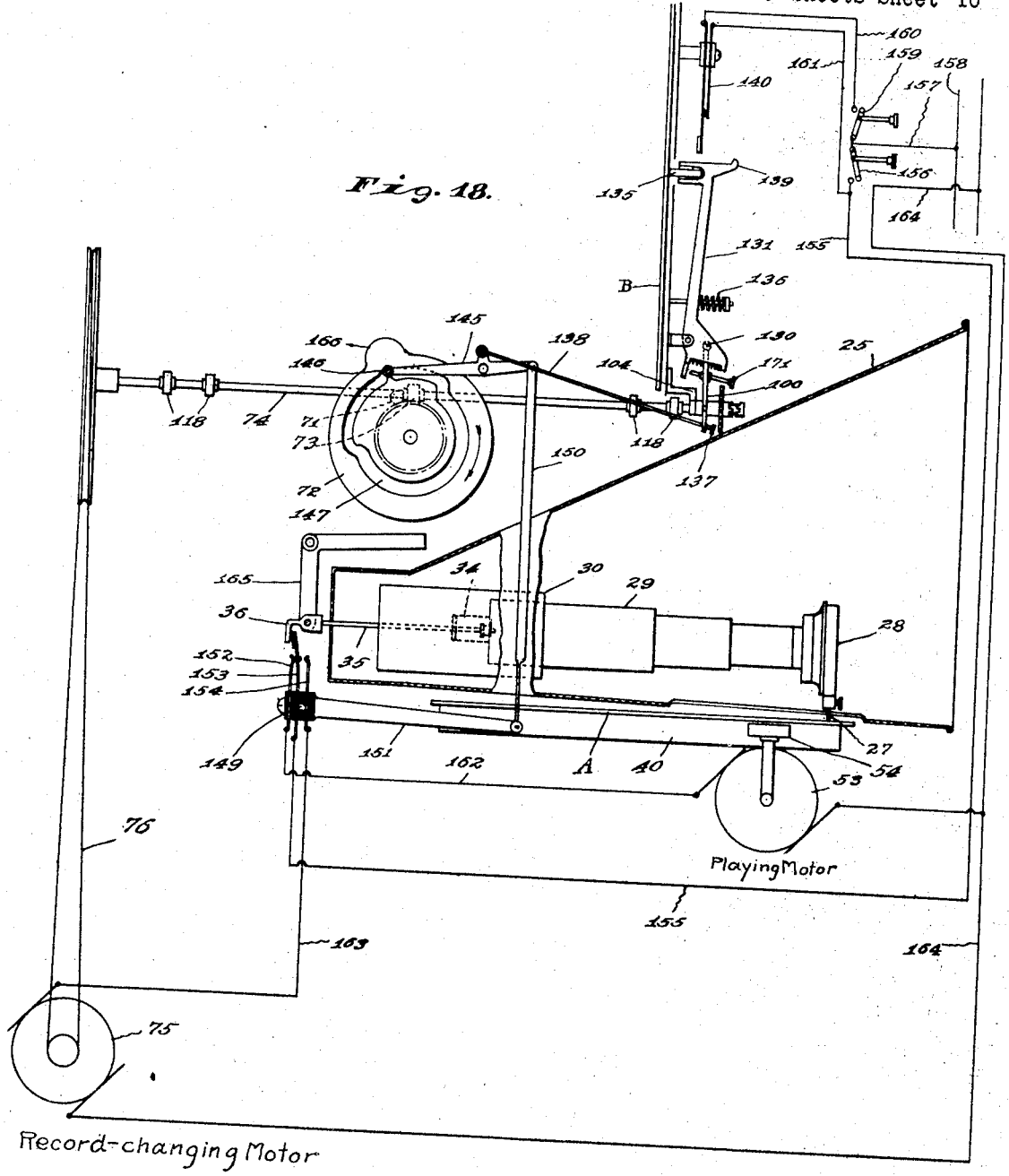
Figure 19:
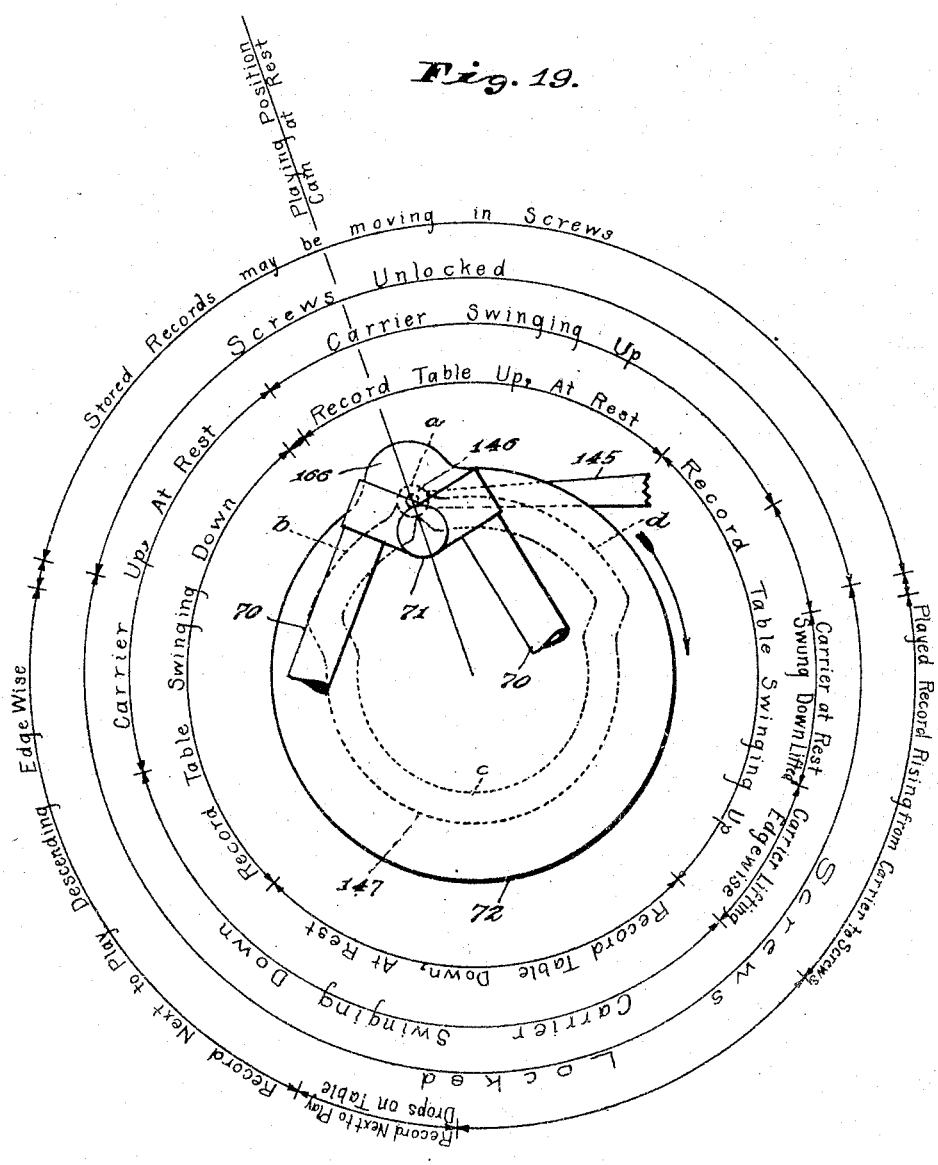

The accompanying drawings illustrate my invention: Fig. 1 is a side elevation, from the left side, of an automatic phonograph embodying my invention, with the record table swung down as it is when records are being changed, and with the case in section and partly broken away; Fig. 2 is a transverse vertical section through the automatic phonograph proper, looking from the front, showing in full lines the parts as they are at one time during record changing, and showing in dotted lines the record table and the carrier both swung to horizontal position, the case being omitted; Fig. 3 is a rear elevation of the automatic phonograph proper, with the parts in the same position as in full lines in Fig. 2, and with the case removed; Fig. 4 is a vertical section on the line 4—4 of Fig. 2, viewed from the left side, showing the record table and record carrier in the position they occupy during playing; Fig. 5 is a horizontal section through the horn and the stationary tube of the tone arm, with the movable tone arm (the tone arm proper) in plan; Fig. 6 is a section on the line 6—6 of Fig. 5, showing a front elevation of the sound box and its associated roller mechanism for moving it forward after a record is played; Fig. 7 is a fragmentary plan of the parts shown in Fig. 6, showing the roller in active and inactive positions in full lines and dotted lines respectively; Fig. 8 is a fragmentary elevation from the rear of the mounting of the record carrier, with the lower end of the record-raising conveyor; Fig. 9 is a longitudinal section through one of the extensive and contractible links, which connect the record table and the record carrier respectively to the operating crank; Fig. 10 is a fragmentary elevation, from the front, in partial section, of the record-lowering conveyor and its associated parts and the mounting of the table-carrying arm; Fig. 11 is a horizontal section on the line 11—11 of Fig. 1, with the record table and record carrier swung up to the horizontal positions shown in dotted lines in Fig. 2; Fig. 12 is a fragmentary plan, in partial section, of the row of stored records at the end from which they are played, and the mechanism associated therewith and controlled thereby; Fig. 13 is a fragmentary elevation of the mechanism shown in Fig. 12; Figs. 14, 15, 16, and 17 are diagrammatic views, taken from the rear, showing the record table and record carrier and their operating mechanism in a number of positions: the position they have during playing is shown in full lines in Fig. 14, and successive positions they have during the record-changing operation are shown in Fig. 14 in dotted lines, in Fig. 15, in Fig. 16 in full and dotted lines, and in Fig. 17; Fig. 18 is a diagram of the electrical connections, with such associated parts as add to the understanding thereof; Fig. 19 is a cycle diagram, with the main cam disc as the basis, showing such main cam disc in the position it has during playing, and indicating on various parts of the cam disc the operations as such parts pass the cam-operated roller; and Fig. 20 is a diagram of the general arrangement; and Fig. 21 is a plan of a modification of the parts shown in Fig. 5.

Figure 20:
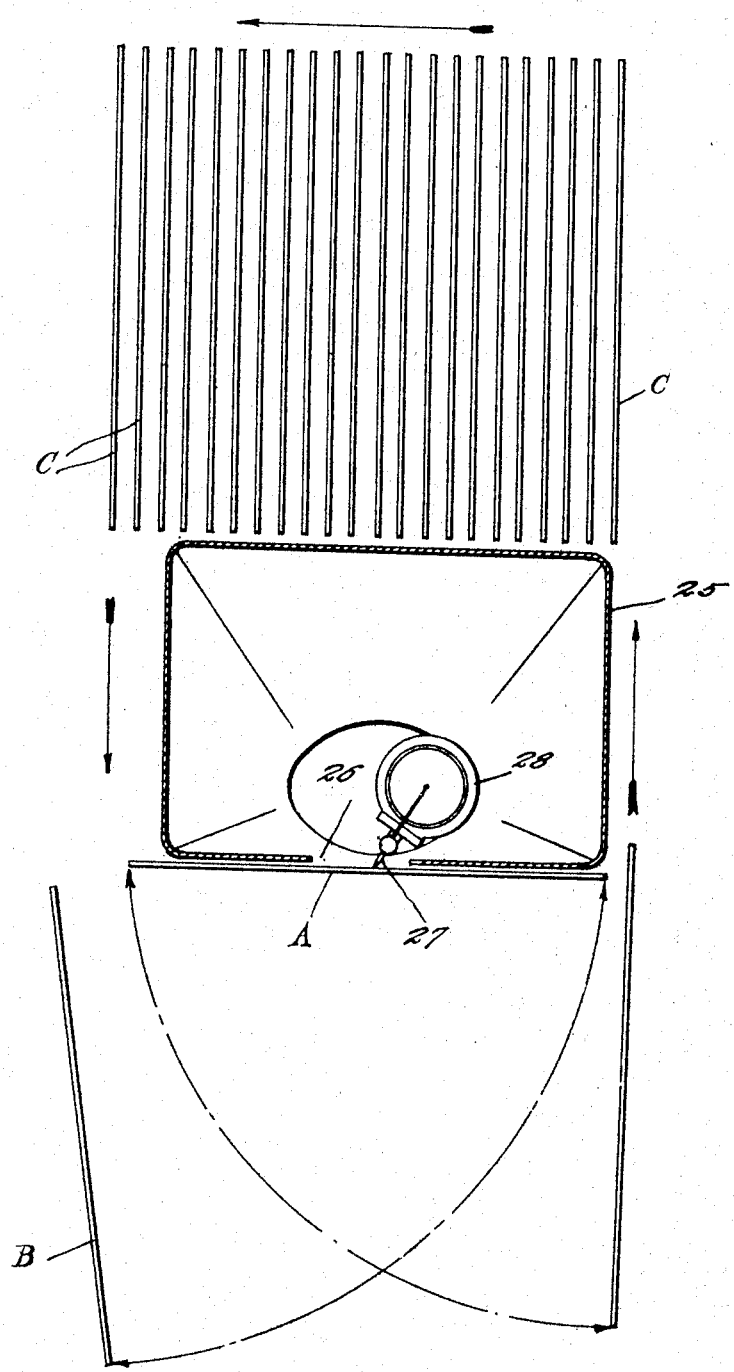

The general arrangement and operation of the device may perhaps be most easily understood from the diagram constituting Fig. 20. The records to be played are stored in a horizontal series at the top of the device, on edge, so that when the cover is lifted these records are readily accessible and may be removed or put in place or changed in order as desired. The amplifying horn is arranged below this series of records, with its large open end behind the usual sound-outlet opening, and conveniently the tone arm with its sound-box and needle are arranged inside of this horn so that the needle projects through a slot provided in the bottom of the horn to cooperate with a record being played. This record being played lies in horizontal position on a supporting table, which rotates about a vertical axis, so that the needle may travel on the horizontal upper surface of the record, which arrangement produces the best results. When a record A on the record table has been played, the rotation of such table is automatically stopped, and the transferring mechanism is set into operation. By this transferring mechanism, the played record A is turned into a vertical position, and shifted upward to a position at one end of the row of stored records; and record B at the other end of such row of stored records is moved downward out of such row and turned to horizontal position for playing. At a suitable time, preferably during the transferring operation, the whole row of records is shifted toward the end from which the record B was removed, to bring the next record C into the position of removal; when the record C reaches this position of removal, the shifting of the row of records is automatically stopped. When the transferring operation is completed, the record table is started into rotation to play the record B.

Thus the record to be played is removed from one end of the row of records, shifted downward and turned to horizontal position for playing, in which position it is played, and when it has been played it is turned to vertical position and shifted upward and placed at the opposite end of the row of records from which it was removed. The record when returned to the row of stored records has its faces interchanged in position, so that if a series of double-faced records is played through twice the entire group of records is played first on one side and then played on the other side.

I provide two controlling devices, either of which may set the machine in operation. When one is used, the playing of records continues indefinitely, regardless of gaps in the row of records, playing the entire row of records first on one side and then on the other and continuing indefinitely until the operation is stopped by said controlling device. When the other controlling device is used, the row of records to be played must be in a continuous row without a gap, starting from the end from which records are removed. If there is a gap at any point, when the record next ahead of such gap is automatically removed from the row to be played so that there is a gap between the point of removal and a subsequent record, the playing is automatically stopped. This is of special advantage in playing single-faced records.

The entire mechanism is carried by a frame 20, which is conveniently removably mounted within a suitable case 21 (shown only in Fig. 1) which may be any standard phonograph case, usually with a hinged top 22 which permits access to the upper part, and with a front sound-emitting opening 23, controllable by a door 24, and located in front of the large end of the horn 25.

The lower side of the horn 25, is usually substantially horizontal, and is provided with a longitudinally extending, rather wide slot 26, (Fig. 5), through which projects the usual needle 27, carried by the usual sound box 28. This sound box 28 is mounted on the front end of a tone arm 29 (Fig. 4) telescoping rectilinearly forwardly and rearwardly within a stationary tube 30 as the tone arm 29 moves along its axis. The tone arm has a sliding joint within the tube 30, and both the tone arm and the tube 30 are open at their rear ends to allow the free passage of the sound into the horn 25.

The whole tone-arm structure, (Fig. 5), including the sound box 28 and the tube 30, is mounted inside of the horn 25, and extends substantially horizontally, the tube 30 being fixed on and the tone arm 29 being slidable along a U-shaped wire frame 31 suitably supported in the horn 25. To guide the tone arm in its axial movements, it is provided with a cross-arm 32, which at one end projects above and may rest on one arm of the frame 31, and which at the other is provided with two guide rollers 33 which cooperate with the other arm of the frame 31 to permit longitudinal travel and vertical transverse swinging of the sound box with respect to the frame 31, as is clear from Figs. 5 and 6. The tone arm 29, the tube 30, the frame 31, and the slot 26 are all preferably slightly oblique to the axis of the horn 25 (see Fig. 5), as thereby a more nearly radial travel of the needle on the face of the record beneath is obtained. The rear end of the tone arm 29, within the tube 30, is provided with a loop 34, through which loosely projects a rod 35 having at its rear end a switch-operating finger 36, which is pulled forward when the tone arm 29 is moved forward as hereinafter described, the effective length of the rod 35 being adjustable by a nut 37.

The record A being played lies horizontal beneath the horn 25, in position to be engaged by the needle 27. During playing, the needle supports the weight of the sound box and its attached parts, one end of the cross arm 32 being lifted clear of the frame 31 as indicated in Figs. 4 and 6. The record A being played rests on a rotatable table 40, which is slightly smaller in diameter than the record and than its largest-diameter record-groove, as is clear from Figs. 1, 4, and 5. As the table 40 and record A rotate, the needle 27 travels in the usual spiral track of the record, gradually approaching the center, the sound box 28 and tone arm 29 traveling rearward to permit this movement. When the record has been played, the tone arm and sound box are caused to move forward again.

In the arrangement shown, this forward movement is started by a button 41 (Figs. 4, 5, and 6) provided on the record A (and on each other record which the machine is to play) inside of the inner end of the spiral track of the record. This button 41, which may be merely a small lump of sealing wax, co-operates with a roller 42 carried by an arm 43 pivotally mounted on a slanting hinge pin 44 carried by the sound box 28 and normally spring-pressed by a light combined compression and torsion spring 45 both upward as far as an adjusting screw 48 (Fig. 6) permits and about its pivot pin 44 to the position shown in full lines in Figs. 4 and 5 and in dotted lines in Figs. 6 and 7. As the tone arm moves to the rear, during the playing of the record, the roller 42, which has previously been properly adjusted by the screw 48 (Fig. 6), eventually comes into the path of the button 41, which as the record rotates strikes such roller and swings it and its arm 43 on the slanting pivot pin 44. By reason of the slant of the pivot pin 44, this swinging causes the roller to move downward into engagement with the face of the rotating record A, whereupon the friction between the record and the roller swings the latter farther on its pivot pin 44 until stopped by the engagement of a tail piece or stop finger 46 (Figs. 5, 6, and 7) forming part of the arm 43 with an adjustable stop screw 47 on the sound box 28; this interaction of the roller with the record raises the sound box 28 and needle 27 so that the needle clears the record. This is indicated in Fig. 6, which for simplification of the drawings shows the record A as being moved downward from the dotted-line to full-line position, though in reality the needle and sound box are moved upward; but the relative movement between the two is as shown. The stop finger 46 and stop-screw 47 stop the roller 42 before it reaches a position with its axis parallel to the intersecting radius of the record, and because of this and of the friction between the roller and the record the roller travels in an increasing spiral over the face of the record and moves the tone arm 29 forward. At the end of this forward movement of the tone arm, the loop 34 strikes the nut 37 and pulls the finger 36 forward to operate a switch (hereinafter described) to cause a change of records.

The record table 40 is rotatably mounted (Figs. 1, 2, 3, and 4) in a bearing 50 on a swinging arm 51 mounted at its left edge on a pivot 52. The table 40 is driven by an electric motor 53, which as shown is carried by the arm 51 and has a friction driving-wheel 54 bearing against the edge of the table 40 to drive it; but it is not necessary so to mount the motor 53, as it can be drivingly connected to the table 40 in any suitable manner. The table 40 is provided with a centrifugally operated brake 55, adjustable by a screw 56, in the usual manner of phonograph tables, these parts also being shown as mounted on the arm 51. The arm 51 with the parts carried thereby is swingable from the horizontal playing position, shown in full lines in Fig. 4 and in dotted lines in Fig. 2, down to the position shown in full lines in Figs. 1 and 2, in which latter position it is held by a stop 57 while it receives the next record to be played, in a manner hereinafter set forth. The arm 51 near its free edge is provided with two fingers 58, which may carry rollers 59, on which the edge of the record next to be played rests when the arm 51 is swung down.

When the arm 51 swings up, it carries with it the record it has received, to playing position; but when it swings down it does not carry with it the record which has just been played, as such record is taken from the descending table 40 by a record carrier 60 pivotally mounted (Figs. 2, 3, 4, 8 and 11) at the opposite edge from the arm 51 so that it may swing up and down on the other side of the frame 20. The arm 51 is pivoted on the left side of the device, viewed from the front, and the record carrier 50 on the right side (see Fig. 2). The record carrier 60 is bifurcated to fit around the arm 51 and table 40, as is clear from Fig. 11, and the ends of its two arms are provided with pins 61 for supporting the descending record by its edge as the record carrier approaches the vertical. The record carrier 60 is not directly pivoted on the frame 20, but has a pivotal mounting 62 at an eccentric point on an arm 63 pivoted on the frame 20 on a pivot pin 64. The carrier 60 projects along the end of the arm 63 past the pivot pin 62, and is provided with an adjusting screw 65 which co-operates with an in-turned flange 66 on the arm 63 to provide an adjustable limit to the relative movement between the carrier 60 and arm 63, as is clear from Figs. 2 and 8. As the arm 63 is swung to lower the record carrier, the record carrier swings with it until its free end engages a stop 67, whereupon the continued movement of the arm 63 causes the screw 65 and the flange 66 to separate, as shown in Fig. 2 and in chain lines in Fig. 8, and the carrier to be lifted edgewise bodily upward from the dotted line to the chain line position shown in Fig. 8, to start the record carried by such carrier upward in the record raising conveyor as hereinafter described.

In order to operate the arms 51 and 63, such arms are connected by links 70 to a crank pin 71 on a cam disc 72, which is suitably connected, as by worm gearing 73, to a shaft 74, driven by a record-changing motor 75, as by a belt 76 and suitable pulleys (Fig. 3). The record-changing motor 75 preferably has a centrifugally operated brake 68, adjustable by a screw 69 to control the motor speed and therefore the time required for changing records and the length of the intermission between the playing of successive records.

The two links 70 are substantially alike, and a longitudinal section of one of them is shown in Fig. 9. Each of these links comprises an outer tube 77 and an inner tube 78, respectively provided at opposite ends of the link with attaching means 79 and 80 for pivotal attachment to the pin 71 and to the associated arm (51 or 63) respectively. A tension spring 81 within the inner tube 78 has its two ends connected to abutments 82, which have heads, shown as tapered, which overlie the ends of both the inner and outer tubes. The spring 81 tends to hold the inner tube 78 wholly within the outer tube 77, but permits such inner tube to be moved against the spring in either direction along the outer tube 77, to project out of either end of the latter, as may be required, to lengthen or shorten the link, the outer tube being longitudinally slotted where the attaching means 80 from the end of the inner tube projects through it. With this construction, the link 77 has a definite normal length, which may be either increased or decreased against the tension of the spring 81 as necessity arises. The throw of the crank pin 71 is greater than is required to produce the desired movements of the table 40 and record carrier 60, so that when the table 40 reaches its upper or lower limit of movement or the carrier 60 reaches its upper limit of movement (dotted lines Fig. 2) the associated links 70 lengthen or shorten as required to allow the crank pin 71 to continue to travel in its circular path while the table or carrier stands still.

Figure 15:
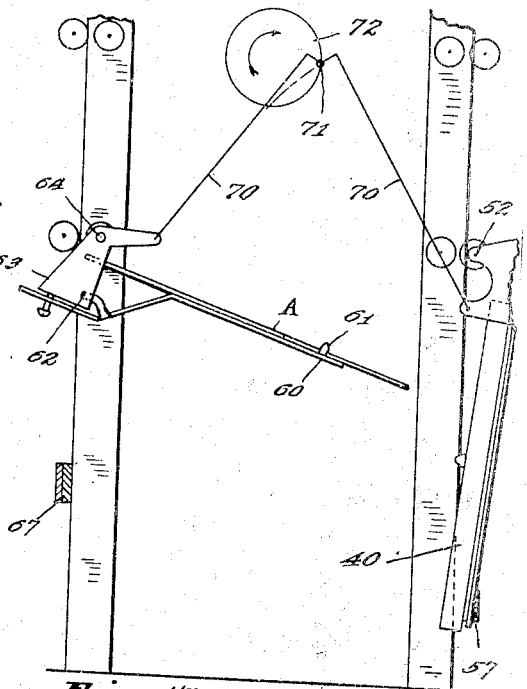
Figure 16:
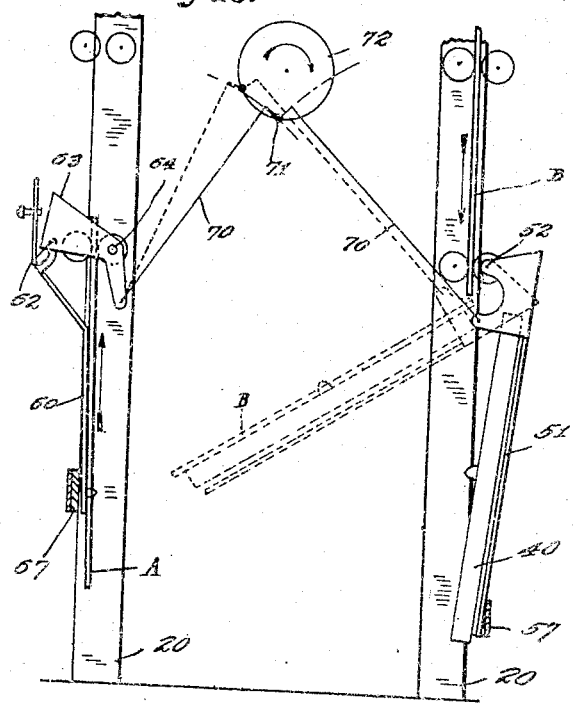
Figure 17:
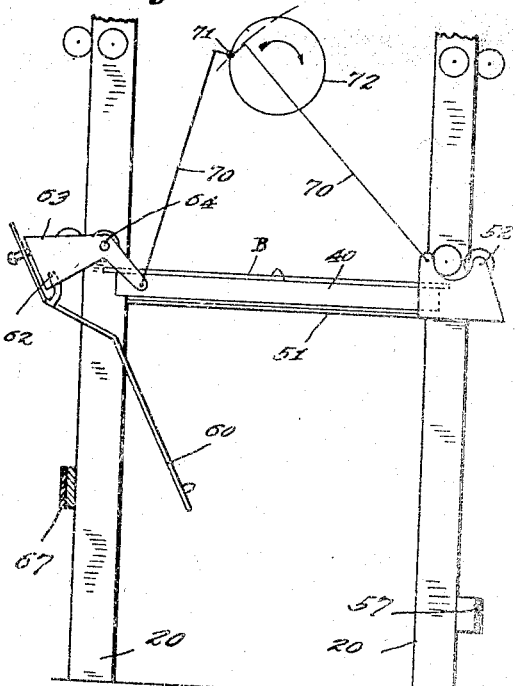

The sequence of movements of the record table and record carrier are indicated in Figs. 14 to 17 inclusive. The upward movements of the arm 51 and record carrier 60 are limited by the engagement of a finger 58 with an adjustable stop 85 (Figs. 2 and 11) on the frame 20. During playing, the table 40 is horizontal and the carrier 60 slightly below the horizontal, as shown in Fig. 14 (full lines); but when the playing of a record is completed and the cam disc 72 starts into motion to change records the carrier 60 moves upward, to the dotted-line position in Fig. 14, while the table 40 remains stationary, then the table descends in advance of the carrier, leaving the played record A on the carrier, as indicated in Figs. 15 and 16, and when the descended table has received the new record B it swings upward from the full-line position shown in Fig. 16 through the dotted-line position shown in such figure to or nearly to the position shown in Fig. 17, the played record A in the meantime being removed from the carrier before the carrier 60 moves upward. Thus both the descending and the ascending movement of the table is in advance of that of the carrier.

The records being stored are supported in the top of the frame, above the horn 25, on three parallel screws 90, 91, and 92. The screws 90 and 91 are in the same horizontal plane and closer together than the diameter of one of the records, and the screw 92 is above the screw 91, so that the records rest in vertical position on the screws 90 and 91 and are held in such vertical position by the guide screw 92. This arrangement permits the records to be put in and lifted out at will, it being necessary only to see that the records go in corresponding notches formed by the threads of the several screws. The screws 90 and 91 travel in opposite directions, as shown by the arrows in Figs. 1 and 4, so that their adjacent sides move upward to avoid possibility of binding the records between them; and in order to feed the records to the left (Fig. 2) as the screws rotate, the screw 90 is a right-hand screw and the screw 91 a left-handed screw, both screws being of the same pitch. The screw 92 is also of the same pitch, and is shown as a right-hand screw rotating in the same direction as the screw 90, though it could be just the reverse of this. The screws support the records above a trough-like partition 93, extending transversely of the frame 20, but the records clear this partition, which is provided merely to guard against the records falling through if dropped between the screws in improper positions.

The three screws 90, 91, and 92 are driven by an endless chain 94, (Figs. 1, 2, 3, and 12), which passes around its sprocket 95 on the screw 91 in the opposite direction from that in which it passes around the sprockets 96 and 97 on the other two screws. The endless chain also passes under a tightening idler 98 and over a driving sprocket 99 loosely carried on the shaft 74 which is driven from the record-changing motor 75. The sprocket 99 may be slid longitudinally of the shaft 74 by a shifting arm 100. When in one endwise position, shown in dotted lines in Fig. 12, the sprocket 99 is clutched to the shaft 74 by intermeshing clutch teeth on one of its end faces and on a collar 101 fixed on the shaft 74. When in the other endwise position, an eccentric pin 102 carried by the other end of the hub of the sprocket 99 enters a corresponding eccentric hole 103 in the adjacent bearing 104 for the shaft 74, to lock the sprocket 99 against turning. The pin 102 can enter the hole 103 only when the sprocket 99 has been rotated to a definite position; and the several sprockets 99, 95, 96, and 97 are all of the same size, so that this requires that the several screws 90, 91, and 92 be in predetermined angular positions when the pin 102 enters the hole 103 to lock the sprocket 99 and through it the several screws against movement. The endless chain 94 is of any suitable type which provides sufficient lateral flexibility to avoid interference with the axial shifting of the sprocket 99. One example of such a chain is the oval-link chain shown.

The two ends of each of the screws 90 and 91 have deep transverse slots 110 at their ends, into which slots the threads of such screws lead. These slots are vertical and those in each screw face directly toward the other screw when the screws are locked in stationary position by the pin 102 and hole 103. In this position, the slots, which are deeper than the screw threads, permit the vertical passage through them of a record between the screws 90 and 91. At the left-hand end of the screws a record passes downwardly through such slots; this is the next record to be played, and passes down onto the table 40. At the right-hand end of the screws a record passes upwardly through such slots; this is the record which has just been played, and has passed up from the carrier 60.

In order to convey the records upward and downward, to the table 40 and from the carrier 60, a conveyor is provided below each end of the screws, about midway between the screws 90 and 91 (Fig. 1). These conveyors comprise four endless belts 111, 112, 113, and 114, arranged in pairs to form the two conveyors, one pair beneath each end of the screws. Each endless belt travels over an upper pulley 115 and a lower pulley 116. The upper pulleys are mounted on shafts 117, which are driven from the shaft 74 by suitable worm gearings 118. These belts are all parallel, and the upper shafts are directly above their corresponding lower shafts; and the two belts of each pair have their adjacent stretches close together so that they grip between them a record which has passed through or is about to pass through one set of the slots 110. The adjacent stretches of the belts 111 and 112 travel down to convey a record from the screws to the table 40; while those of the belts 113 and 114 travel upward, to convey a record from the carrier 60 to the screws, the upwardly traveling record being lifted into the space between the two belts by the vertical bodily movement, already described, of the carrier 60 from the dotted-line position to the chain-line position shown in Fig. 8. The screws are of course stationary while the records are passing through the slots 110. The ascending record which is conveyed upwardly by the belts 113 and 14 through the slots 110 at the right-hand ends of the screws is lifted sufficiently far by such belts so that when thereafter the screws start to rotate the lower edges of the bottoms of the slots 110 at such right-hand end, as they approach each other in the rotation of the screws 90 and 91, lift the ascending record farther into a position sufficiently high to travel along the screw threads.

The belts 111, 112, 113, and 114 are in movement all the time the record-changing motor 75 is in operation. However, it is desirable that the record at the left-hand end of the screws should not be carried downwardly by the belts 111 and 112 as soon as the latter start into motion, as the record would then get to the bottom of its travel before the table 40 was in position to receive it. Therefore, a bent finger 120 (Fig. 10) is mounted on a shaft 121 and is spring-pressed to pass beneath the center of the lower edge of the record in the slots 110 at the left of the screws, to hold such record from dropping between the belts 111 and 112 until the proper time. The releasing of the finger 120 is controlled by the position of the arm 51. Such arm has pivotally connected to it near its pivotal mounting 52, but on the opposite side of such mounting from the table 40, a push rod 122, which is adjustable in length, and the upper end of which co-operates with a finger 123 fixed on the shaft 121. The push 122 has a guide mounting 124 near its upper end, which guide mounting permits it a slight lateral play, and the push rod is provided with a spring 125 which tends to throw its upper end beneath the finger 123. Another finger 126 on the shaft 121 acts against the side of the push rod 122 when the shaft 121 is turned, to displace such push rod laterally against its spring 125 so that it clears the finger 123.

When the table 40 descends by the turning movement of the arm 51, the push rod 122 is pushed upward, and is held by its spring 125 beneath the finger 123. As the push rod moves upward, it engages the finger 123 and rocks the shaft 121; and at a predetermined point in such upward movement, determined by the adjustment of the length of the push rod 122, the bent finger 120 is slid from beneath the record and allows such record to drop into co-operation with the belts 111 and 112, to be carried down by the latter and deposited on the table 40. The finger 120 releases the record sufficiently late to allow the table to get into proper position to receive such record by the time the record reaches the table. As the push rod 122 continues to rise after the finger 120 has released the record, the finger 126 engages the push rod and pushes it from beneath the finger 123, whereupon the spring 127 which acts on the shaft 121 throws the finger back toward its normal position, and into the normal position when the descending record has got out of the way. However, as the finger 120 is released from the push rod 122 before such record has got out of the way, such finger strikes the face of the record, and though this blow is comparatively light because the spring 127 is light the end of the finger 120 is preferably provided with a cushion 128, conveniently of rubber, to prevent marring the record.

The shifting arm 100 for the sprocket 99 is controlled by the records at the left-hand end of the screws. For this purpose, such shifting arm is mounted on a pivot pin 130 carried by a lever 131 which in turn is mounted on a fixed pivot pin 132. Two opposed springs 133 and 134 act on opposite sides of the shifting arm 100, between it and suitable ears on the lever 131, one or the other of such springs predominating in its action on the shifting arm according to the position of such lever 131. At its opposite end from the springs 133 and 134, the lever 131 carries a roller 135, which engages a record at or sufficiently near the left-hand end of the screws. A spring 136 acts on the lever 131 to force the roller 135 against the record; this spring 136 is stronger than the springs 133 and 134. As the records move toward the left in the screws, the end record engages the roller 135, and forces the lever 131 about its pivot pin 132 against the spring 136, thus putting the spring 134 under compression tending to shift the shifting arm 100 to move the sprocket 99 to disengage the latter from the collar 101 and to interengage the pin 102 and hole 103; but this movement of the shifting arm 100 and sprocket 99 does not occur until the pin 102 and hole 103 register, which is when the record at the left-hand end of the row of stored records reaches the end of its leftward movement and drops into the transverse slots 110, as shown in full lines in Fig. 12. When now this record which acted on the roller 135 descends, and passes out of engagement with the roller 135, the spring 136 moves the lever 131 toward the right of the row of records, and toward or into contact with the next record in the row of records. This movement of the lever 131 puts the spring 133 under compression tending to move the shifting arm 100 to clutch the sprocket 99 with the collar 101, but such movement of the shifting arm 100 and sprocket 99 does not immediately occur, because the shifting arm is held by an adjustable nut 137 on the end of a rod 138 from moving until such rod is moved by a mechanism hereinafter described.

If when the lever 131 is moved by its spring 136 when one record descends there is a record in the next notch of the screw, as shown by dotted lines in Fig. 12, the roller 135 stops when it engages that record, and a projecting finger 139 on the lever 131 has no effect; however, if there is no such record in the next notch of the screw, the lever 131 moves farther under the influence of its spring 136, to the dotted-line position shown in Fig. 12, in which case the finger 139 engages the projecting end of one leaf of a spring switch 140 to open such switch, as shown in dotted lines in Fig. 12. The opening of this switch may cause the stopping of the action of the whole mechanism, as will be explained hereinafter when the electrical connections are considered.

The rod 138 is connected to one arm of a three-armed lever 145 (Figs. 3 and 19). A second arm of the lever 145 carries a roller 146 which travels in a cam groove 147 in the face of the cam disk 72. This cam groove 147 has portions at three different radii, there being a short peak $a$ of largest radius, portions $b$ and $d$ of intermediate radius on each side of the peak $a$, and a long radius $c$ of short radius connecting the outer ends of the portions $b$ and $d$ and extending more than 180° of the cam. Only when the roller 146 is in the short-radius part $c$ of the cam groove 147 does the nut 137 hold the shifting arm 100 from moving to separate the pin 102 from the hole 103; and as soon as the roller 146 passes from the part $c$ to the part $d$ of the groove 147 the nut 137 releases the shifting arm 100, allowing the spring 133, which is already compressed for action, to move the shifting arm 100 to unclutch the sprocket wheel 99 from the stationary bearing 104 and clutch it through the collar 101 to the then moving shaft 74. This movement of the roller 146 from the part $c$ to the part $d$ of the cam groove 147 occurs only after the played record has completed its upward movement through the slots 110, so that before that there will be no movement of the screws, tending perhaps to break such record. The movement of the roller 146 from the part $d$ to the part $a$ of the cam groove has no effect on the shifting arm 100.

The third arm of the three-armed lever 145 is connected by a link 150 to an arm 151 on a shaft 149 which carries the three members 152, 153, and 154 of a double-throw switch, which switch is also in part controlled by the finger 36. The three switch members, which of course are insulated from one another, are all light spring members, capable of considerable bending without exceeding their elastic limit. The middle arm 153 is longer than the other two, to engage the finger 36, and by its resiliency tends to engage the switch finger 152 and to disengage itself from the switch finger 154. Preferably the middle arm 153 engages one of such switch fingers before it disengages itself from the other, so that there is no neutral position. The arm 153 is connected by a wire 155 to one side of a push-and-pull switch 156, the other side of which is connected by a wire 157 to one of the wires of the supply circuit 158. A second push-and-pull switch 159 and the switch 140 are connected in series with each other, and in shunt to the push-and-pull switch 156, by wires 160 and 161. Thus when the switch 156 is closed the switch 140 is ineffective; but when the switch 156 is open and the switch 159 is closed the operation is in part controlled by the switch 140. The two unit fingers 152 and 154 are connected by wires 162 and 163 to one side of the playing motor 53 and to one side of the record-changing motor 75 respectively, the other sides of such two motors being connected by a common wire 164 to the other side of the supply circuit 158.

The finger 36 is carried by one end of a bell-crank lever 165, the other end of which is in the path of a cam 166 on the cam disk 72, to produce movement of such finger 36 to the left to the position from which it was moved by the forward movement of the tone arm 29 by the roller 42 already described. This movement of the finger 36 by the cam 166 produces a corresponding movement of the tone arm 29 and sound box 28, to get the needle 27 in position to start playing on the next record which comes into playing position.

In operation:

Assuming that the parts are as shown in Fig. 4, with the record A on the table 40, and that one or the other of the switches 156 and 159, say the switch 156, is closed. Under these conditions, the switch arm 153 is in contact with the switch finger 152, so that the circuit for the playing motor 53 is closed and such motor is driving the table 40 and the record A thereon. The needle 27 travels in the groove of the record A in the usual manner of phonographs, to play the record, moving inward and carrying the sound box 28 and tone arm 29 with it.

During the playing of the record A, the parts are in the position shown in Fig. 4, and the cam disk 72 is in the position shown in Figs. 18 and 19 and in full lines in Fig. 14, with the crank pin 71, the peak $a$ of the cam groove 147, and the cam 166, which are preferably all in the same radial line, slightly to the left of the vertical as viewed from the back; so that, as is apparent from Fig. 14, the table 40 is fully raised to the horizontal, but the carrier 60 is not fully raised.

When the record A has been played, the button 41 strikes the roller 42 to throw it into engagement with the surface of the record A, and the roller 42 lifts the needle, sound box, and tone arm and carries them forward by reason of the increasing spiral in which the roller 42 travels on the face of the record A. When the sound box 28 and tone arm 29 reach the end of its forward movement, the loop 34 strikes the nut 37 and pulls the finger 36 forward, thus raising the free end of the bell-crank lever 165 and moving the switch arm 153 into contact with the switch finger 154 and out of contact with the switch finger 152. This breaks the circuit of the playing motor 53, and makes the circuit of the record-changing motor 75.

Upon the throwing of the switch arm 153 by the finger 36 as above described, and the consequent stopping of the playing motor and starting of the record-changing motor, the rotation of the table 40 and of the record A stops and the shaft 74 starts into operation to drive its associated parts. This causes the belts 111, 112, 113, and 114 to start traveling in the direction of the arrows, and also causes the cam disk 72 to start to move in a clockwise direction (Figs. 2, 14, 15, 16, 17, 18, and 19) as viewed from the rear. The record-changing operation is performed while the cam disk 72 makes one complete rotation. As the cam disk 72 moves, the roller 146, which has been in the peak $a$ of the cam groove 147 while the playing was proceeding, is moved inward to the portion $b$ of such cam groove to tilt counterclockwise (Fig. 5) the three-armed lever 145. This moves the nut 137 toward the arm 100, but without producing any effect, because such shifting arm and nut were disengaged by a greater distance than such movement of the nut; and it also rocks the shaft 149 in a counterclockwise direction (Figs. 4 and 18) to bend the switch arm 153 and switch finger 154 to hold them even more firmly in contact, or to give them a second increment of closure, the spring of such finger and arm being insufficient, however, to move the finger 36 and bell-crank lever 165. The movement of the shaft 74 may or may not at this time drive the sprocket 99 and through it the screws 90, 91, and 92, depending upon whether or not the record B is already at the extreme left hand end of such screws in the slots 110. If the record B is not yet there, as it may not be, the sprocket 99 is driven through its clutch connection with the collar 101 to operate the screws to feed the records to the left until the record at the left end engages the roller 135 and causes the sprocket 99 to be unclutched from the collar 101 and clutched to the bearing 104 to stop the movement of the screws when such end record reaches the slots 110 as shown in full lines in Fig. 12.

As the cam disk 72 moves in the direction of the arrow, the carrier 60 is raised from the position shown in full lines to the position shown in dotted lines in Fig. 14, thus coming into engagement with the under face of the record A near its edge to support such record. As the cam disk 72 still continues to move, but not until after the carrier 60 has been lifted as described, the arm 51 with its table 40 is lowered, leaving the record A on the now stationary carrier 60; and after the table 40 has got out of the way the carrier 60 also starts downward, as is indicated in Fig. 15. This is because of the opposite obliqueness of the extensible and contractible links 70, which extend and contract as necessary.

As the arm 51 and table 40 move downward, toward the position shown in Fig. 15, in which position they are stopped by the stop 57, the push rod 122 is pushed upward, to engage the finger 123 and rock the shaft 121. Before the shaft 121 is rocked to move the bent finger 120, however, the roller 146 passes from the portion $b$ to the smaller-radius portion $c$ of the cam groove 147, to rock the three-armed lever 145 forward in the same direction in which it was previously rocked, or counterclockwise in Fig. 3, to cause the nut 137 to move the shifting arm 100 into clutching engagement with the bearing 104 and out of clutching engagement with the collar 101 if it is not already in such position, so that the screws will be stationary before the shaft 121 is rocked; this further rocking of the three-armed lever 145 also rocks the shaft 149 farther, to bend the switch arm 153 and switch finger 154 still more firmly in engagement, thus producing a third increment of closure between such switch parts.

Assuming that there was a record B already in the slots 110 or sufficiently close to the left-hand end of the screws so that it reached such slots and is resting on the bent finger 120 before the last-mentioned movement of the three-armed lever 145 and nut 137, the upward movement of the push rod 122 above described when it rocks the shaft 121 moves such finger 120 out from beneath such record B, and allows the record B to drop slightly into the space between the belts 111 and 112, which carry such record downward, and eventually deposit it, with a rather slight drop, onto the table 40, where it is held by the fingers 58. As has already been stated, the table 40 is in position to receive this record before the record is dropped by the belts 111 and 112 onto the rollers 59 of the arms 58.

As the cam disk 72 continues to rotate, the parts pass from the position shown in Fig. 15 to the position shown in Fig. 16. The carrier 60 swings downward subsequently to the table 40 and strikes its stop 67, and thereupon is bodily raised to insert the upper edge of the record A into the lower end of the space between the two removing belts 113 and 114, as shown in Figs. 3 and 16 and in chain lines in Fig. 8, so that such belts will carry the record A upward through the slots 110 in the right-hand ends of the screws 90 and 91 and into position to be picked up by such screws when they next start to rotate. During the descending movement of the record B and the ascending movement of the record A, the roller 146 is in the portion $c$ of the cam slot 147 to prevent rotation of the screws, and so the screws are still.

During the downward and upward movements of the new and old records the cam 166 passes through its lowermost position and strikes the free arm of the bell-crank lever 165, thus tilting such lever to move the finger 36 and the tone arm 29 back to the position from which they started. This takes off one increment of closure of the switch members 153 and 154, but still leaves the two increments of closure which were due to the rocking movements of the three-armed lever 145, so that such switch members remain in contact and the circuit of the record-changing motor 75 remains closed.

As the cam disk 72 still continues to move, it swings upward the arm 51 and table 40, with the record B thereon, passing through the dotted-line position shown in Fig. 16 to the full-line or playing position shown in Figs. 17 and 14, and subsequently swings upward the carrier 60 from the position shown in Fig. 16 through the position shown in Fig. 17 to the position shown in Fig. 14, which last-named figure shows the table and carrier in the position they have during playing.

During this upward movement of the record carrier 60, and after the record A has been carried upward through the slots 110 at the right-hand ends of the screws, the roller 146 passes from the portion $c$ to the portion $d$ of the cam groove 147. This rocks the three-armed lever 145 in the reverse direction, or clockwise in Fig. 3, so that the nut 137 is moved away from the shifting arm 100 and so that the shaft 149 is rocked to remove another increment of closure between the switch members 153 and 154. This movement of the shaft 149 does not effect the motor operation, however, because there is still one increment of closure between such switch members remaining. The movement of the nut 137, however, permits the shifting arm 100 to move to cause the sprocket 99 to be unclutched from the bearing 104 and clutched to the collar 101 so that it rotates to drive the three screws 90, 91, and 92. This movement of the shifting arm 100 is actually produced by the expansion of the compressed spring 133, for when the record B descended out of engagement with the roller 135 such roller and the arm 151 were moved to compress the spring 133 by reason of the action of the stronger spring 136; but such movement of the lever 131 did not at that time produce any movement of the shifting arm 100 because such shifting arm was held by the nut 137, which was in holding position because the roller 146 was then in the portion c of the cam groove 147.

When the screws are thus set into operation by the shifting of the sprocket 99 as described, they feed the records supported by them to the left. If record C is sufficiently close to the left end of the screws, it strikes the roller 135 and moves it and the arm 131 to produce stoppage of the screws, as already described, when such record reaches the slots 110, before the record-changing operation is complete; but otherwise the lever 131 is not shifted before the record-changing operation is completed, but remains in position to permit the screw movement to be resumed when the next record-changing operation starts.

The screws may turn, unless held by the pin 102 and hole 103, at any time save when the roller 146 is in the short-radius portion c of the cam groove 147. That is, it is possible for the screws to operate to move the records to the left at any time when the roller 146 is in the portions d, a, or c of the cam groove 147, so that such screws start to move the records to the left near the end of the record-changing operation, and continue such movement of the records to the left at the beginning of the next record-changing if the stored record at the left end of the row has not already reached the slots 110. However, the movement of the screws is stopped by the shifting of the sprocket 99, whether the screws have turned only one revolution, as will be the case if there was a record in the next adjacent notches to the slots 110, or have turned a number of revolutions, as they will if that is required in order to bring a record to the slots 110 because of a gap in the row of stored records.

As the cam disk 72 completes its rotation, the roller 146 is moved from the portion d to the peak a of the cam groove 147. This rocks the three-armed lever 145 a second time in a clockwise direction (Fig. 3), produces a movement of no effect on the nut 137, and also produces a rocking of the shaft 149 to remove the third and final increment of closure between the switch members 153 and 154 and allows the switch member 153 to engage the switch finger 152 and disengage itself from the switch finger 154. This stops the record-changing motor 75, by breaking its circuit, and so stops the movement of all the parts driven by such motor; and starts the playing motor 53, by making its circuit. The playing of the record B now proceeds, until it is finished, whereupon the operation which has been described is repeated to change from the record B to the record C.

This will keep up indefinitely, if it was the push-and-pull switch 156 which was closed, playing the stored records in order from the left to the right, on one side of the records, and then playing the records over again on their other sides, and then repeating the playing on the first side, and so on indefinitely. This continues whether or not the entire number of records which the screws can hold are stored thereon, and regardless of any gaps or uneven spacing in the stored records. During the playing of a record, the stored records and the record-changing mechanism remain still, but when the playing of such record has been completed it is removed from the table and carried up to the right-hand end of the row of stored records, passing up on the right-hand side of the horn, while the record which is then at the left-hand end of the row of stored records descends on the left-hand side of the horn and is received on the playing table.

Under some circumstances there may be two or more record-changing operations between successive playing operations. The screws 90, 91, and 92 are driven many times as fast as the cam disc 72. They may make a number of revolutions during that part of a record-changing operation during which they are unlocked to permit records to be moving in them (Fig. 19), or during which the portions d, a, and b of the cam groove 147 are active. If the records are so arranged in the screws that there is no gap greater than the screw-pitch multiplied by that number of revolutions, a record will be played immediately upon the completion of each record-changing operation.

If there is a greater gap than this, two or more record-changing operations may intervene between successive playings of records. Then the table 40 may come to playing position at the end of a record-changing operation, with no record in position for playing. In such case, because the table 40 is smaller in diameter than the largest-diameter record-groove in a record, the needle projects downward past the edge of the table 40 as the latter swings up to horizontal position, so that the table engages the roller 42. When now the switch member 153 engages the switch finger 152 to stop the record-changing motor and start the playing motor, as above explained, the resultant rotation of the table 40 at once acts on the roller 42 by friction to cause it to carry the sound box 28 and tone cam 29 forward, through the slight distance necessary at this time; and this movement of the tone arm immediately disengages the switch member 153 from the switch finger 152 and pulls it into engagement with the switch finger 154; which stops the playing operation almost as soon as it started, and starts another record-changing operation. In this, no record is removed from the table, because there is none there, but a record may be placed on the table.

In practice, I prefer to proportion the gearing so that with as few as two records, one on the table and one in the screws during a playing operation, I can get successive playings with only one intervening record-changing operation; two records is a minimum for doing this. This means that the screws 90, 91, and 92 can carry a record half their length during the time the portions $d$, $a$, and $b$ of the cam groove are active in one record-changing operation. This is only a preference, however.

Even if there is only one record in use, the device still continues in operation, alternately playing opposite sides of the same single record, with the necessary number of record-changing operations intervening between successive playings—two intervening with the preferred arrangement of gearing above referred to.

Of course, if all the records are removed, there will be no playing. Then there is only a succession of recording-changing operations, alternating with abortive startings of playing operations which stop at once after starting because there is no record on the table to engage and lift the needle 27.

If the circuit is made through the push-and-pull switch 159, however, instead of through the switch 156, the playing of the records is automatically stopped when a gap in the row of stored records is reached. This gap may be located at any point in the row of stored records, and gradually progresses to the left as successive records are played. When the record just ahead of this gap descends through the slots 110 at the left of the screws, and the roller 135 and lever 131 swing inward under the action of the spring 136, the absence of a record in the next notches of the screws allows the roller 135 to swing past the plane of such next notches (which the absent record would occupy if it were present), so that the lever 131 and roller 135 move all the way to the dotted-line position shown in Fig. 12, and the finger 139 opens the switch 140 to break the circuit leading to the motors, thus causing the apparatus to stop. This action occurs because the switch 140 is in the motor circuit when such circuit is closed through the switch 159. Thus if the switch 156 is closed, the playing of records continues indefinitely, so long as such switch remains closed; but if the circuit is closed through the switch 159, with which the switch 140 is in series, the playing stops when a gap in the row of stored records is reached.

In the arrangement as so far described, the stoppage of the apparatus when such gap in the row of stored records is reached occurs immediately when the switch 140 is opened. I prefer, however, to delay the stoppage somewhat, preferably until the record next to be played is on the table and the played record is placed in the screws, as I find that breakage of records by outside interference is thereby minimized. To this end I provide a finger 170 on the lever 131, projecting past the spring 133, and in the shifting arm 100 I provide a screw 171 for engaging the finger 170 and thus stopping the movement of the lever 131 before the latter reaches a position to open the switch 140. The shifting arm is held at this time by the nut 137, as the roller 146 is in the short-radius portion $c$ of the cam groove 147. When the roller 146 is moved by coming into co-operation with the portion $d$ of such cam groove, the nut 137 releases shifting arm 100, and allows both such arms to move to screw-starting position (as already described) and the lever 131 to move (to the dotted-line position in Fig. 12) to open the switch 140 and stop the operation of the whole device.

Sometimes it may be desired to repeat a record immediately, for an encore, instead of passing to the next record. To provide for obtaining an encore at will, in a convenient way, a stop finger 175 is pivotally mounted on the wire frame 31, near its accessible forward end, and is spring-pressed to inoperative position by a spring 176. By manually throwing this stop finger 175 to operative position (see full lines in Fig. 21), in which position it is held by a latch 177, it is put in position to engage the roller 42 and swing such roller to inoperative position (dotted-lines Fig. 21) out of engagement with the record when such roller is feeding the sound box 28 forward and just before the nut 37 is struck by the loop 34 to pull the switch-operating finger 36 forward. This drops the sound box 28 to put the needle 27 in an outer groove of the record just played, whereupon the same record is played a second time. While the latch 177 may be manually releasable, I prefer to release it automatically, so that the regular operation of the whole device will proceed without further attention after the one encore. For this purpose I provide a releasing finger 178 on the sound box 28, for releasing the latch 177 automatically immediately after the stop finger 175 strikes the roller 42, so that after operating once the stop finger 175 is swung to inoperative position by its spring 176.

I claim as my invention:

1. In a phonograph, the combination of a record-supporting table, a horn, said table being outside of said horn, and a tone arm mounted within said horn and provided with a needle-carrying sound box, said horn being provided with a slot through which the needle of said sound box may project into co-operative relationship with a record on said table.

2. In a phonograph, the combination of a record-supporting table arranged to rotate on a substantially vertical axis, a horn, said table being below said horn, and a tone arm mounted within said horn and provided with a needle-carrying sound box, the bottom of said horn being provided with a slot through which the needle of said sound box may project into co-operative relationship with a record on said table.

3. In a phonograph, the combination of a sound-reproducing device, supporting means for said sound-reproducing device permitting it to move in a substantially straight line, a record-carrying table for carrying a record in co-operative relation with the needle on said sound-reproducing device, the line of movement of said sound-reproducing device being parallel to but laterally displaced from a radius of said record, and a horn within which said sound-reproducing device is movably supported and outside of which said table is located, said horn being provided with a slot parallel to the movement of said sound-reproducing device for permitting the needle to project through to co-operate with the record.

4. In a phonograph, the combination of a rotatable vertical-axis record-carrying table, sound-reproducing devices arranged to co-operate with a record on said table, means for storing a plurality of records on edge in a row, transferring mechanism for removing a record from said table and placing it at one end of said row and for removing a record from the other end of said row and placing it on said table.

5. In a phonograph, the combination of a rotatable vertical-axis record-carrying table, sound-reproducing devices arranged to co-operate with a record on said table, means for storing a plurality of records in a row, transferring mechanism for removing a record from said table and placing it at one end of said row and for removing a record from the other end of said row and placing it on said table, means for positively shifting said row of stored records forward after records have been placed at and removed from its respective ends to bring another record to the end from which removal takes place.

6. In a phonograph, the combination of a rotatable record-carrying table, sound-reproducing devices arranged to co-operate with a record on said table, means for storing a plurality of records in a row, transferring mechanism for removing a record from said table and placing it at one end of said row and for removing a record from the other end of said row and placing it on said table, means for shifting said row of stored records forward after records have been placed at and removed from its respective ends to bring another record to the end from which removal takes place, and means controlled by the arrival of a record at the point of removal for stopping said shifting.

7. In a phonograph, the combination of a rotatable vertical-axis record-carrying table, sound-reproducing devices arranged to co-operate with a record on said table, means for storing a plurality of records in a row, transferring mechanism for removing a record from said table and placing it at one end of said row and for removing a record from the other end of said row and placing it on said table, means for shifting said row of stored records forward after records have been placed at and removed from its respective ends to bring another record to the end from which removal takes place, and means for preventing the operation of said shifting means while records are being removed from or placed at the ends of said row of records.

8. In a phonograph, the combination of a rotatable record-carrying table, sound-reproducing devices arranged to co-operate with a record on said table, means for storing a plurality of records in a row, transferring mechanism for removing a record from said table and placing it at one end of said row and for removing a record from the other end of said row and placing it on said table, means for shifting said row of stored records forward after records have been placed at and removed from its respective ends to bring another record to the end from which removal takes place, and means for preventing the operation of said shifting means while records are being removed from and placed at its respective ends and for stopping the operation of said shifting means by the arrival of a record at the point of removal.

9. In a phonograph, the combination of a rotatable record-carrying table, sound-reproducing devices arranged to co-operate with a record on said table, means for storing a plurality of records in a row, transferring mechanism for removing a record from said table and placing it at one end of said row and for removing a record from the other end of said row and placing it on said table, means for shifting said row of stored records forward after records have been placed at and removed from its respective ends to bring another record to the end from which removal takes place, and means for automatically stopping the operation of the machine when upon the removal of a record from one end of the row of stored records there is next to such removed record a gap in the row of stored records.

10. In a phonograph, the combination of a rotatable record-carrying table, sound-reproducing devices arranged to co-operate with a record on said table, means for storing a plurality of records in a row, transferring mechanism for removing a record from said table and placing it at one end of said row and for removing a record from the other end of said row and placing it on said table, driving means for driving said table and said transferring mechanism, and means operated upon the reaching of a predetermined position of the sound reproducing devices relative to the playing of a record on said table for stopping the operation of the table and starting the operation of the transferring mechanism and upon the completion of the operation of the transferring mechanism for stopping the operation of the transferring mechanism and starting the operation of the table.

11. In a phonograph, the combination of a rotatable record-carrying table, sound-reproducing devices arranged to co-operate with a record on said table, means for storing a plurality of records in a row, transferring mechanism for removing a record from said table and placing it at one end of said row and for removing a record from the other end of said row and placing it on said table, driving means for driving said table and said transferring mechanism, and means operated upon the reaching of a predetermined position of the sound reproducing devices relative to the playing of a record on said table for starting the operation of the transferring mechanism and by the completion of the operation of the transferring mechanism for stopping the operation of the transferring mechanism.

12. In a phonograph, the combination of a record-carrying table arranged to rotate about a substantially vertical axis and to support a record in horizontal position, sound-reproducing devices arranged to co-operate with a record on said table, means for storing a plurality of records, said storing means being arranged to permit any individual record to be removed or put in place while other records remain in position, and transferring mechanism operated upon the reaching of a predetermined position of the sound reproducing devices relative to a record on the table for removing the played record from said table and placing it in said record-storing means and for placing on the table a record from said record storing means.

13. In a phonograph, the combination of a record-carrying table arranged to rotate about a substantially vertical axis and to support a record in horizontal position, sound-reproducing devices arranged to co-operate with a record on said table, means for storing a plurality of records, said storing means being arranged to permit any individual record to be removed or put in place while other records remain in position, and transferring mechanism operated upon the reaching of a predetermined position of the sound reproducing devices relative to a record on the table for removing the played record from said table and for placing on the table a record from said record-storing means.

14. In a phonograph, the combination of a record-carrying table arranged to rotate about a substantially vertical axis and to support a record in horizontal position, sound-reproducing devices arranged to co-operate with a record on said table, means for storing a plurality of records on edge, said storing means being arranged to permit any individual record to be removed or put in place while other records remain in position, and transferring mechanism operated upon the reaching of a predetermined position of the sound reproducing devices relative to a record on the table for removing the played record from said table and placing it in said record-storing means and for placing on the table a record from said record storing means.

15. In a phonograph, the combination of a record-carrying table arranged to rotate about a substantially vertical axis and to support a record in horizontal position, sound-reproducing devices arranged to co-operate with a record on said table, means for storing a plurality of records on edge, said storing means being arranged to permit any individual record to be removed or put in place while other records remain in position, and transferring mechanism controlled by the completion of the playing of a record for removing the played record from said table and for placing on the table a record from said record-storing means.

16. In a phonograph, the combination of a record-carrying table arranged to rotate about a substantially vertical axis and to support a record in horizontal position, sound-reproducing devices arranged to co-operate with a record on said table, said record-carrying table being located below said sound-reproducing devices, means for storing a plurality of records on edge in a row above said sound-reproducing devices, and automatic transferring mechanism for removing a played record from said table and elevating it to and placing it on said record-storing means on edge at one end of such row and for removing a record from said record-storing means at the other end of such row and placing it on said table to be played in horizontal position.

17. In a phonograph, the combination of a record-carrying table arranged to rotate about a substantially vertical axis and to support a record in horizontal position, sound-reproducing devices arranged to co-operate with a record on said table, said record-carrying table being located below said sound-reproducing devices, means for storing a plurality of records on edge above said sound-reproducing devices, said storing means being arranged to permit any individual record to be removed or put in place while other records remain in position, and automatic transferring mechanism for removing a played record from said table and elevating it to and placing it in said record-storing means on edge and for removing a record from said record-storing means and placing it on said table to be played in horizontal position.

18. In a phonograph, the combination of a record-carrying table arranged to rotate about a substantially vertical axis and to support a record in horizontal position, sound-reproducing devices arranged to co-operate with a record on said table, said record-carrying table being located below said sound-reproducing devices, means for storing a plurality of records on edge in a row above said sound-reproducing devices, and automatic transferring mechanism for removing a played record from said table and elevating it to and placing it in said record-storing means at one end of such row and for removing a record from said record-storing means at the other end of such row and placing it on said table to be played in horizontal position.

19. In a phonograph, the combination of a record-carrying table arranged to rotate about a substantially vertical axis and to support a record in horizontal position, sound-reproducing devices arranged to co-operate with a record on said table, said record-carrying table being located below said sound-reproducing devices, means for storing a plurality of records on edge above said sound-reproducing devices, said storing means being arranged to permit any individual record to be removed or put in place while other records remain in position, and automatic transferring mechanism for removing a played record from said table and elevating it to and placing it in said record-storing means and for removing a record from said record-storing means and placing it on said table to be played in horizontal position.

20. In a phonograph, the combination of a record-carrying table arranged to rotate about a substantially vertical axis and to support a record in horizontal position, sound-reproducing devices arranged to co-operate with a record on said table, said record-carrying table being located below said sound-reproducing devices, a plurality of screws extending horizontally above said sound-reproducing devices and arranged to support a plurality of records in a row on edge, transferring mechanism for removing a played record from said table and placing it on edge in said screws at one end of said row and for removing a record from said screws at the other end of said row and placing it on said table, and means for operating said screws to feed the record toward the latter end of said row.

21. In a phonograph, the combination of a record-carrying table arranged to rotate about a substantially vertical axis and to support a record in horizontal position, sound-reproducing devices arranged to co-operate with a record on said table, a plurality of screws extending horizontally and arranged to support a plurality of records in a row on edge, transferring mechanism for removing a played record from said table and placing it on edge in said screws at one end of said row and for removing a record from said screws at the other end of said row and placing it on said table, and means for operating said screws to feed the record toward the latter end of said row.

22. In a phonograph, the combination of a record-carrying table, sound-reproducing devices arranged to co-operate with a record on said table, a plurality of screws arranged to support a plurality of records in a row, transferring mechanism for removing a played record from said table and placing it in said screws at one end of said row and for removing a record from said screws at the other end of said row and placing it on said table, and means for operating said screws to feed the records toward the latter end of said row.

23. In a phonograph, the combination of a record-carrying table, sound-reproducing devices arranged to co-operate with a record on said table, a plurality of screws arranged to support a plurality of records in a row, transferring mechanism for removing a played record from said table and placing it in said screws at one end of said row and for removing a record from said screws at the other end of said row and placing it on said table, and means for operating said screws to feed the records toward the latter end of said row and controlling means for stopping the operation of said screws when a record reaches the point of removal therefrom.

24. In a phonograph, the combination of a record-carrying table, sound-reproducing devices arranged to co-operate with a record on said table, a plurality of screws arranged to support a plurality of records in a row, transferring mechanism for removing a played record from said table and placing it in said screws at one end of said row and for removing a record from said screws at the other end of said row and placing it on said table, and means for operating said screws to feed the records toward the latter end of said row, and means for preventing the operation of said screws while a record is being brought into or taken out of co-operative relation therewith by said transferring mechanism.

25. In a phonograph, the combination of a record-carrying table, sound-reproducing devices arranged to cooperate with a record on said table, a plurality of screws arranged to support a plurality of records in a row, transferring mechanism for removing a played record from said table and placing it in said screws at one end of said row and for removing a record from said screws at the other end of said row and placing it on said table, and means for operating said screws to feed the records toward the latter end of said row, and means for preventing the operation of said screws while a record is being brought into or taken out of co-operative relation therewith by said transferring mechanism and for stopping the operation of said screws when a record reaches the point of removal therefrom.

26. In a phonograph, the combination of a record-carrying table, sound-reproducing devices arranged to co-operate with a record on said table, a plurality of screws arranged to support a plurality of records in a row, transferring mechanism for removing a played record from said table and placing it in said screws at one end of said row and for removing a record from said screws at the other end of said row and placing it on said table, and means for operating said screws to feed the records toward the latter end of said row, and means for automatically causing the stopping of the whole device when upon the removal of a record from said screws the next notch of the screws contains no record.

27. In a phonograph, the combination of a vertical-axis record-carrying table, sound-reproducing devices arranged to co-operate with a record on said table, means for storing a plurality of records on edge in close proximity to said sound-reproducing devices, and automatic mechanism for removing a record from said record-storing means and placing it on said table in playing position and for removing a played record from said table and replacing it in said record-storing means at a location distant from the location of removal.

28. In a phonograph, the combination of a record-carrying table, sound-reproducing devices arranged to co-operate with a record on said table, a plurality of screws arranged to support a plurality of records, automatic mechanism for transferring a record from one end of said screws to said table and for transferring said record from said table to the opposite end of said screws, and automatic means for operating said screws to move said record toward said first-named end.

29. In a phonograph, the combination of a record-carrying table, sound-reproducing devices arranged to co-operate with a record on said table, a plurality of screws arranged to support a plurality of records, automatic mechanism for transferring a record from one end of said screws to said table and for transferring said record from said table to the opposite end of said screws, and automatic means for operating said screws to move said record toward said first-named end, and controlling means for interrupting and re-establishing the operation of said screws between the beginning and the end of the last-named movement of said record.

30. In a phonograph, the combination of a record-carrying table, sound-reproducing devices arranged to co-operate with a record on said table, a plurality of screws arranged to support a plurality of records, automatic mechanism for transferring a record from one end of said screws to said table and for transferring said record from said table to the opposite end of said screws, and automatic means for operating said screws to move said record toward said first-named end, and controlling means for interrupting the operation of said screws when said record reaches a predetermined point in said last-named movement.

31. In a phonograph, the combination of a record-carrying table, sound-reproducing devices arranged to co-operate with a record on said table, a plurality of screws arranged to support a plurality of records, automatic mechanism for transferring a record from one end of said screws to said table and for transferring said record from said table to the opposite end of said screws, and automatic means for operating said screws to move said record toward said first-named end, means for automatically causing a stopping of all operation if upon the transferring of a record from said one end of said screws the next notch of the screws is vacant.

32. In a phonograph, the combination of a record-carrying table, sound-reproducing devices arranged to co-operate with a record on said table, a plurality of screws arranged to support a plurality of records, automatic mechanism for transferring a record from one end of said screws to said table and for transferring said record from said table to the opposite end of said screws, and automatic means for operating said screws to move said record toward said first-named end, means for automatically causing a stopping of all operation if upon the transferring of a record from said one end of said screws the next notch of the screws is vacant, and means for producing delay in such automatic stoppage.

In witness whereof, I have hereunto set my hand at Indianapolis, Indiana, this 27th day of September, A. D. one thousand nine hundred and twenty.

HAROLD E. THOMPSON.